United States Patent
Yokoi

(10) Patent No.: US 11,880,570 B1
(45) Date of Patent: Jan. 23, 2024

(54) STORAGE SYSTEM, DATA TRANSMISSION METHOD, AND NETWORK INTERFACE

(71) Applicant: Hitachi, Ltd., Tokyo (JP)

(72) Inventor: Nobuhiro Yokoi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/945,173

(22) Filed: Sep. 15, 2022

(30) Foreign Application Priority Data

Jul. 15, 2022 (JP) .................................. 2022-113983

(51) Int. Cl.
*G06F 3/06* (2006.01)

(52) U.S. Cl.
CPC .......... *G06F 3/0611* (2013.01); *G06F 3/0659* (2013.01); *G06F 3/0688* (2013.01)

(58) Field of Classification Search
CPC ..... G06F 3/0611; G06F 3/0659; G06F 3/0688
See application file for complete search history.

(56) References Cited

U.S. PATENT DOCUMENTS

| | | |
|---|---|---|
| 8,387,073 B1 | 2/2013 | Micalizzi et al. |
| 10,310,811 B2 | 6/2019 | Shergill et al. |
| 11,604,609 B1* | 3/2023 | Bi .......................... G06F 3/0652 |
| 2004/0165588 A1* | 8/2004 | Pandya ............... H04L 63/0218 |
| | | 370/389 |
| 2015/0058658 A1* | 2/2015 | Izuta ................... G06F 11/0772 |
| | | 714/57 |
| 2016/0034719 A1* | 2/2016 | Choi ................... G06F 12/1408 |
| | | 713/193 |
| 2018/0285074 A1* | 10/2018 | Shergill ..................... G06F 5/14 |

* cited by examiner

*Primary Examiner* — Charles Rones
*Assistant Examiner* — Han V Doan
(74) *Attorney, Agent, or Firm* — MATTINGLY & MALUR, PC

(57) ABSTRACT

A storage systems is configured so that when a network interface receives a write request, the network interface performs protocol processing on the write request and transfers a write command to a storage controller, the storage controller reserves a data storage area in a cache memory, the network interface receives a data transfer request from the storage controller and stores data relating to the write request in the reserved storage area of the cache memory, the storage controller transfers a write response to the network interface, and the network interface responds to the source of the write request.

8 Claims, 21 Drawing Sheets

FIG. 7A

BUFFER LIST MANAGEMENT INFORMATION 750

| BUFFER ENTRY HEAD ADDRESS 751 | ACTIVE BUFFER COUNT 752 |
|---|---|
|  |  |

FIG. 7B

BUFFER ENTRY 703

| BUFFER ENTRY ADDRESS 761 | BUFFER ADDRESS 762 | NEXT BUFFER ENTRY ADDRESS 763 |
|---|---|---|
|  |  |  |

FIG. 7C

BUFFER MANAGEMENT TABLE 770

| BUFFER ENTRY 703 | BUFFER ENTRY COUNT 773 | BUFFER SIZE 771 | BUFFER ADDRESS 762 | ALLOCATION STATUS 772 |
|---|---|---|---|---|
|  |  |  |  |  |
|  |  |  |  |  |
|  |  |  |  |  |

STORAGE SYSTEM, DATA TRANSMISSION METHOD, AND NETWORK INTERFACE

CROSS-REFERENCE TO RELATED APPLICATION

The present application claims priority from Japanese application JP2022-113983, filed on Jul. 15, 2022, the contents of which is hereby incorporated by reference into this application.

BACKGROUND

The present invention relates to a storage system, a data transmission method, and a network interface.

An information processing system is formed, for example, of a server system on which user applications and the like operate, a storage controller that manages data to be saved and improves the reliability thereof, and a drive box that contains a plurality of drives that store and hold data used by the server system.

The information processing system receives a request from the server system, for example, in the case of a write request, the server system transfers write data to the storage controller, which stores the write data in a drive in the drive box.

U.S. Pat. No. 10,310,811 discloses Immediate Data buffer control. In U.S. Pat. No. 10,310,811, a buffer for Immediate Data is allocated in advance in a storage controller memory and used exclusively by a network I/F and a driver layer.

U.S. Pat. No. 8,387,073 discloses iSCSI hardware offloading. U.S. Pat. No. 8,387,073 describes large-scale PDU transmission offloading using digest processing, data and copy operation, and an S/G list. The buffer for Immediate Data uses a storage memory.

A method for transferring write data in the following procedure is known as a related-art technique. That is, an initiator such as a server system first issues a write command to a target such as a storage controller. Thereafter, a memory area for receiving the write data on the target side is reserved, the target then issues a Ready to Transfer (R2T) command to inform the initiator of the reservation. The initiator then transfers the write data to the target. Thereafter, when the write data transfer is completed, the target transmits a write response to the initiator.

In the method, however, after the write command is transmitted, the write data is transmitted in another PDU (protocol data unit), which causes the following problems. That is, the response period is doubled due to the round trip. This is a problem especially when the distance between the initiator and target is long. In addition, packet processing performed on the write command, Ready to Transfer, write data and write response causes a large CPU load and memory access load.

In contrast, there is known Immediate Data transfer in which the initiator transmits both the write command and the write data with sufficient memory prepared in advance on the target side.

However, even in the Immediate Data transfer, only part of the load of the packet processing performed on the write command, Ready to Transfer, write data, and write response is reduced. Specifically, only the CPU load and the memory access load relating to part of the packet processing on the Ready to Transfer command and the packet processing on the write data are reduced.

An object of the present invention is to provide a storage system, a data transmission method, and a network interface capable of reducing the CPU load and the memory access load in the target.

SUMMARY

To achieve the object described above, the present invention relates to a storage system including a storage drive that stores data, a storage controller that includes a processor and a cache memory and processes data input to and output from the storage drive, and a network interface that includes a processor. When the network interface receives a write request, the network interface performs protocol processing on the write request and transfers a write command to the storage controller, the storage controller receives the write command from the network interface, reserves a data storage area in the cache memory, and transmits a data transfer request to the network interface, the network interface receives the data transfer request from the storage controller and stores data relating to the write request in the reserved storage area of the cache memory, the storage controller performs predetermined processing on the data stored in the cache memory and relating to the write processing, and transfers a write response to the network interface, and the network interface receives the write response from the storage controller and performs the protocol processing to respond to the source of the write request.

The network interface, which includes a memory, can receive data along with the write request, store the data in the memory of the network interface, receive the data transfer request, and store the data stored in the memory in the cache memory. In this case, the memory provided in a smart network interface card can be used as a buffer.

The write request can be transmitted along with write data based on Immediate Data transfer. In this case, the transfer speed at which the write data is transferred is improved.

Furthermore, the storage controller can be configured not to support the Immediate Data transfer. In this case, the storage controller can perform the Immediate Data transfer even when the storage controller does not support the Immediate Data transfer.

The write request can support first R2T-free data transmission based on InitialR2T disabled transfer. In this case, the first R2T can be omitted.

Furthermore, the storage controller can support InitialR2T enabled transfer. In this case, data can be transferred even in a typical transfer scheme different from the Immediate Data transfer.

Moreover, when the storage controller performs as the predetermined processing any of making the data stored in the cache memory involatile, duplicating the data, and storing the data in the storage drive, the storage controller can transfer the write response. In this case, the data transfer can be more reliably performed.

The present invention further relates to a data transmission method in a storage system including a storage drive that stores data, a storage controller that includes a processor and a cache memory and processes data input to and output from the storage drive, and a network interface that includes a processor. When the network interface receives a write request, the network interface performs protocol processing on the write request and transfers a write command to the storage controller, the storage controller receives the write command from the network interface, reserves a data storage area in the cache memory, and transmits a data transfer request to the network interface, the network interface receives the data transfer request from the storage controller and stores data relating to the write request in the reserved storage area of the cache memory, the storage controller performs predetermined processing on the data stored in the cache memory and relating to the write processing, and transfers a write response to the network interface, and the network interface receives the write response from the storage controller and performs the protocol processing to respond to the source of the write request.

The present invention further relates to a network interface including a processor and a memory and connected to a network. When receiving a write request containing data via the network, the network interface stores the data in the memory and transfers the write request that does not contain the data to a target of the write request. When receiving a data transfer request from the target, the network interface stores the data stored in the memory in a storage area specified by the data transfer request.

When receiving the write request containing data, the network interface can perform protocol processing and transfer the write request that does not contain the data. In this case, the CPU load and the memory access load in the target can be further reduced.

The present invention can provide a storage system, a data transmission method, and a network interface capable of reducing the CPU load and the memory access load in the target.

BRIEF DESCRIPTION OF THE DRAWINGS

FIG. 7A shows buffer list management information contained in each buffer list;

FIG. 7B shows information held by a buffer entry;

FIG. 7C shows a buffer management table;

DESCRIPTION OF EMBODIMENT

Figure 1:
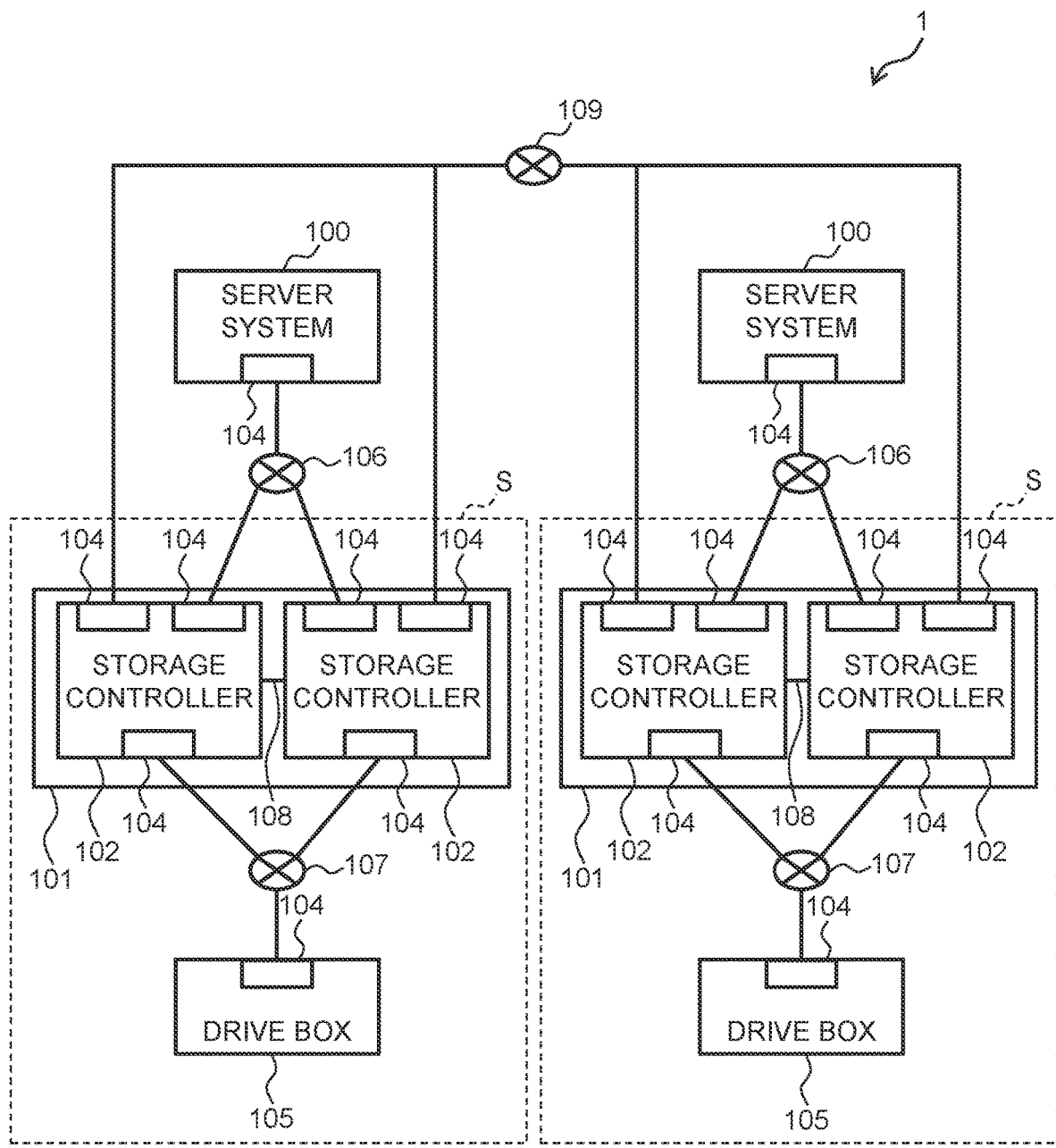
FIG. 1 shows an example of the configuration of an information processing system according to an embodiment of the present invention.

An embodiment of the present invention will be described below in detail with reference to the accompanying drawings. The following description and drawings are examples for describing the present invention, and omission and simplification are made as appropriate for clarification of the description. The present invention can also be implemented in a variety of other forms, and each component may be singular or plural, unless otherwise restricted.

The embodiment described below does not limit the invention according to the claims, and all the combinations of the elements described in the embodiment are not necessarily essential to achieve the invention.

In the following description, a variety of pieces of information may be described in the form of "table", "list", "queue", and other expressions, and may instead be expressed in data structures other than the forms described above. To indicate that the information does not depend on the data structure, an "xxx table", an "xxx list", an "xxx queue", and the like may be referred, for example, to as "xxx information". In the following description, to describe identification information, "identification information", "ID", and other expressions are used, and these expressions can be replaced with each other.

In the following description, a plurality of components having the same function or similar functions basically have the same reference character for description thereof, but the components may have the same function but use different means to realize the function. Furthermore, the embodiment described below may be implemented in the form of software running on a general-purpose computer, in the form of dedicated hardware, or a combination of software and hardware.

In the following description, a process may be described by using a "program" as the subject, and the program is executed by a processor (CPU (central processing unit), for example) to carry out a specified process by using, for example, storage resources (memories, for example) and/or interface devices (communication ports) as appropriate, so that the processor may be regarded as the primary part of the process.

The process described by using a program as the subject may also be a process carried out by a computer including a processor (compute host or storage apparatus, for example). In the following description, the expression "controller" may also refer to a processor or a hardware circuit that carries out part or entirety of the processes carried out by the processor.

The program may be installed on each computer from a program source (program distribution server or computer readable storage medium, for example). In this case, the program distribution server may include a processor and a storage resource, the storage resource may further store a distribution program and the program to be distributed, and the processor of the program distribution server may distribute the program to be distributed to other computers by executing the distribution program.

In the following description, two or more programs may be realized as one program, or one program may be realized as two or more programs.

Furthermore, in the following description, a storage drive or simply a drive (storage) means a physical storage device, typically a nonvolatile storage device (auxiliary storage device, for example). The drive may, for example, be an HDD (hard disk drive) or an SSD (solid state drive). Different types of drives may be incorporated in the information processing system.

In the following descriptions, "RAID" is an abbreviation for Redundant Array of Inexpensive Disks. A RAID group is formed of a plurality of drives (typically drives of the same type) and stores data in accordance with a RAID level associated with the RAID group. The RAID group may also be referred to as a parity group. The parity group may, for example, be a RAID group that stores a parity.

A network interface apparatus in the embodiment of the present specification (hereinafter also simply referred to as network interface) can be implemented in an information processing system including a server system and a storage system. The storage systems can include a storage controller and a drive box. The network interface can include, for example, a general-purpose processor, a memory, a network controller, and an interface with a host system.

<Overall Description of Information Processing System 1>

FIG. 1 shows an example of the configuration of an information processing system 1 according to the embodiment of the present invention.

The information processing system 1 includes one or more server system 100 and storage systems S.

The storage systems S each include one or more storage apparatuses 101 and one or more drive boxes 105.

The storage apparatuses 101 each include one or more storage controllers 102. In the configuration example in shown FIG. 1, the storage apparatuses 101 each include two storage controllers 102. The storage controllers 102 are coupled to one or more server systems 100 via frontend networks 106.

The drive boxes 105 are each an example of a storage drive that stores data. The drive boxes 105 each incorporate one or more drives and are each coupled to the one or more storage controllers 102 via backend networks 107. The storage controllers 102 are each coupled to another storage controller 102 separate therefrom by a short distance via an inter-storage-controller network 108 and further coupled to other storage controllers 102 separate therefrom by medium and long distances via an external network 109.

The server systems 100 are each a host machine on which user applications and the like operate, and each include one or more processors and one or more storage apparatuses, such as memories and auxiliary storage apparatuses. The server system 100 allows, for example, databases and web services to operate thereon. The server system 100 then writes and reads data created by the databases and web services to and from the storage controllers 102. The server system 100, which is coupled to the storage controllers 102 via the frontend network 106, incorporates a network interface 104 as an interface apparatus between the server system 100 and the storage controllers 102. The server system 100 may be formed of a group of a plurality of servers, each including the network interface 104, and may be coupled to the storage controllers 102 and the other server systems 100.

To provide the server system 100 with storage functionality, the two storage controllers 102 in the storage apparatus 101 form a redundant controller. The storage controllers 102 each include one or more processors and one or more storage apparatuses. The storage controllers 102 in the storage apparatus 101 have the same configuration.

The storage controllers 102 each include one or more processors, and the core of each of the processors instructs transfer of data stored in the corresponding drive box 105 in response to a read command or a write command from the server system 100. It can be said that the storage controllers 102 manage the operation of saving write data in a storage.

The memory of each of the storage controllers 102 is formed, for example, of an SDRAM (synchronous dynamic random access memory) or any other semiconductor memory. The memory may be a combination of volatile memory and a nonvolatile memory, the latter of which may, for example, be an SCM (storage class memory).

The memory serves as a primary storage of the processor and stores execution programs (storage control program, for example), management tables to which the processor refers, and the like. The memory is also used as a disk cache (cache memory) used by the storage controller 102.

The storage controller 102 further incorporates a network interface 104 as an interface apparatus between the storage controller 102 and the server system 100.

The storage controller 102 further incorporates a network interface 104 as an interface apparatus between the storage controller 102 and the drive box 105. The network interface 104 is used to communicate with the drive box 105 in terms of information on data transfer, data copying, and storage-related processing instructed by the server system 100.

The drive box 105 incorporates a plurality of SSDs, HDDs, or other drives, and includes internal switches that couple the plurality of drives to the storage controller 102 as well as a processor and a memory used for transfer processing. The drive box 105 receives, stores, and holds data generated by the server system 100 via any of the storage controllers 102.

The drive box 105 may form a RAID between the built-in drives or form a RAID between the plurality of drive boxes 105 to reserve the availability of the data held therein. The drive box 105 is coupled to the storage controllers 102 via the backend network 107, and incorporates a network interface 104 as an interface apparatus between the drive box 105 and the storage controllers 102.

As described above, the network interfaces 104 are apparatuses that are incorporated in the server system 100, the storage controllers 102, and the drive box 105, and serve as coupling interfaces between the variety of apparatuses and the variety of networks. It can be said that the network interfaces 104 are interface apparatuses that couple the variety of apparatuses to each other (in this case, for example, coupling server system 100 and storage controllers 102 to each other, or coupling storage controllers 102 and drive box 105 to each other) via the networks (in this case, frontend network 106 and backend network 107).

The network interfaces 104 can, for example, each be a SmartNIC (network interface card). A SmartNIC is an adapter circuit board that includes a built-in general-purpose processor and memory and causes an operating system to operate to run software to perform network protocol processing. The SmartNIC allows, for example, the same operating system as that running on the server system 100 to operate and further allows software protocol stacks, applications, and the like used in the apparatus that incorporates the SmartNIC to operate. Using a SmartNIC that incorporates a general-purpose processor and a memory to implement protocol processing in the form of software allows flexible support of a plurality of protocols. That is, a variety of protocols can be more readily handled. Furthermore, while achieving the above, the protocol processing load can be offloaded from the storage controllers 102 to the network interfaces 104.

A variety of functions of an SmartNIC may be partially performed by using a hardware offload engine. An SmartNIC may instead have an FPGA-based (field programmable gate array) configuration, in which case the functions are realized on the FGPA. In other forms, an SmartNIC may still instead be configured to serve as dedicated interface hardware implemented entirely in the form of hardware.

The network interfaces 104 will be described later in detail.

The frontend networks 106 are each a storage area network that couples the storage controllers 102 and the server system 100 to each other. The frontend network 106 can, for example, be iSCSI (Internet Small Computer System Interface), NVMe-oF (NVMe over Fabrics), or any other IP network.

The backend networks 107 are each a network that couples the storage controllers 102 and the drive box 105 to each other. The backend network 107 can, for example, be iSCSI, the NVMe-oF, or any other IP network. The backend network 107 is not necessarily an IP network and may instead be an SAS (Serial Attached SCSI) or NVMe (Non-Volatile Memory Express).

The inter-storage-controller networks 108 are each a network used to make the storage controllers 102 redundant and are each formed of a wide-bandwidth interconnection. The inter-storage-controller network 108 can be used, for example, to duplicate write data and share metadata. Even when one of the two storage controllers 102 is not working due to maintenance, failure, or any other trouble, the other storage controller 102 can keep performing storage processing.

The external network 109 is a wide area network (WAN), or a local area network (LAN). The external network 109 is, for example, a network in which the data link layer is Ethernet (registered trademark), the Internet layer is the Internet protocol, and the transport layer is TCP, UDP, or the like, and performs communication using iSCSI-based or NVMe-oF-based protocol data unit (PDU). The external network 109 can employ the form of an Internet line or a dedicated line. Note that the external network 109 may cause a large communication delay depending on the communication distance. In such a case, when a network instrument is not formed solely of a lossless instrument, packet loss is expected to occur although the loss occurrence rate varies depending on the type of the line described above.

The information processing system 1 and the storage systems S may further include components in addition to those shown above. For example, network instruments such as switches and routers may be coupled to and in between the networks, and monitoring and maintenance apparatuses may be coupled thereto. The networks may be configured to be coupled to a storage service on a public cloud via the external network 109.

The network interface 104 of the server system 100 has iSCSI or NVMe-oF initiator software that allows the server system 100 to read and write data from and to the drive box 105 via any of the storage controllers 102. In contrast, a network interface 104 of the storage controller 102, the network interface 104 facing the server system 100, has target software.

A network interface 104 of the storage controller 102, the network interface 104 facing the drive box 105, has the iSCSI and NVMe-oF initiator software that allows the network interface 104 to read and write data from and to the drive box 105. In contrast, the network interface 104 of the drive box 105 has the target software.

The network interfaces 104 of each of the storage controllers 102 further each have iSCSI or NVMe-oF initiator software that allows the storage controller 102 to read and write data from and to any of the other storage apparatuses 101. In contrast, the network interfaces 104 of each of the other storage apparatuses 101 each have the target software.

Note that some of the network interfaces 104 may be NICs having no SmartNIC functionality. For example, the network interface 104 of the server system 100 is an NIC and operates as an initiator, and the network interfaces 104 of the storage controllers 102 are SmartNICs and operate as a target. Instead, some of the network interfaces 104 in the storage controller 102 that are coupled to the backend network 107 may be DKBs (DisK Boards) having no SmartNIC functionality, which may be caused to access the drive box 105 with the aid of SAS (Serial Attached SCSI) or NVMe (Non-Volatile Memory Express).

<Detailed Description of Network Interfaces 104>

The network interfaces 104 will next be described in more detail.

Figure 2:
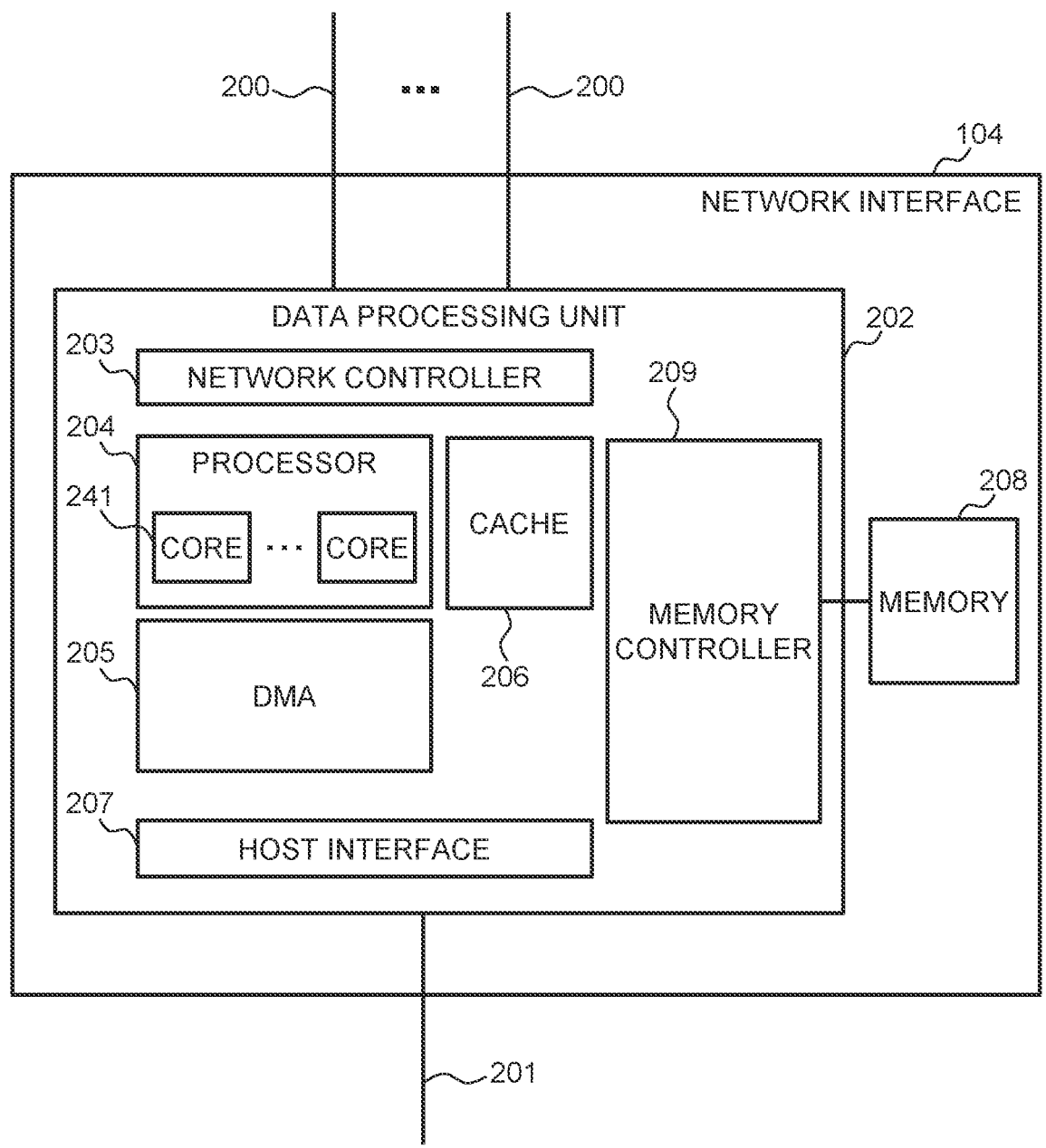
FIG. 2 shows an example of the hardware configuration of a network interface according to the embodiment of the present invention.

FIG. 2 shows an example of the hardware configuration of each of the network interfaces 104 according to the embodiment of the present invention.

The network interface 104 is coupled via a host bus 201 to another instrument that incorporates a network interface 104. The instrument is, for example, the storage controller 102, an internal component of the server system 100, the drive box 105, and the like. The network interface 104 is coupled to the other instrument via a network path 200, for example, in IP network connection.

The network interface 104 includes a data processing unit (DPU) 202 and a memory 208. The data processing unit 202 includes a host interface 207 for coupling to the host bus 201, and a network controller 203, which is coupled to any of the network paths 200 and performs network protocol processing. The data processing unit 202 further includes a processor 204, a memory controller 209, a DMA (direct memory access) controller 205, and a cache 206.

The host bus 201 is a bus that couples the network interface 104 to any of the storage controllers 102, the server system 100, the drive box 105, and the like. The host bus 201 is a broadband, high-speed interconnection and is configured to be coupled, for example, to a processor and other components of the instrument that incorporates the host bus 201 with the aid of PCIe (Peripheral Component Interconnect Express).

The host interface 207 is an interface that couples the network interface 104 and the host system (hereinafter simply referred to as host) to each other via the host bus 201. For example, when the host bus 201 complies, for example, with PCIe, the host interface 207 may include a PCIe PHY (physical layer). The DMA controller 205 allows the memory 208 in the network interface 104 to exchange data with a memory of the host. In the following specification and drawings, when the term "host" is used, the term means a target such as any of the storage controllers 102. The term "host" is replaced with a "network interface host" in some cases.

The network paths 200 are, for example, each an IP network path and each have the form of a network, a WAN, a LAN, or a SAN (storage area network). The network interface 104 performs communication over one network path 200, or over two or more network paths 200 in consideration of redundancy.

The network controller 203 is an interface that couples the network interface 104 to any of the network paths 200. The network controller 203 carries out, for example, a process associated with the physical layer, such as PHY, and stateless processes associated with the data link layer, the Internet layer, and the transport layer. The network controller 203 performs, for example, checksum and frame processing.

The network controller 203, for example, supports Ethernet, IP, TCP, and UDP. Furthermore, the network controller 203 may include an offload engine using, for example, IPsec (Internet security protocol), TLS (transport layer security), or DIF (data integrity field). The network controller 203 may still instead have a configuration that supports coupling to optical cables, copper cables, or other cables.

The processor 204 is, for example, a general-purpose processor and executes an operating system also used, for example, in the server system 100 and the like. The processor 204 further executes other types of software to perform protocol processing, command processing, management of the network interfaces 104, and other types of processing. The processor 204 may have any configuration. For example, the processor 204 include one or more CPUs or MPUs (micro processing units) and may include one or more cores 241.

The memory 208 is formed, for example, of a semiconductor memory, such as an SDRAM. In addition to the above, the memory 208 may be combined with an SCM or any other nonvolatile memory. The memory 208 serves as a primary storage for the processor 204 and stores execution programs (instruction codes for protocol processing and command processing) and management tables to which the processor refers, and the like. The memory 208 is also used as a buffer that stores commands and data transmitted and received to and from a network. Furthermore, the memory 208 serves as a queueing interface with the network controller 203 and the host interface 207, and stores queue descriptors, indices, and other parameters.

The memory controller 209 is an interface that controls the memory 208 when reading and writing data from and to the memory. The memory controller 209 may be built, for example, in the processor 204. The memory controller 209 may be built, for example, in the data processing unit 202 or in the network interface 104.

The cache 206 is located between the memory 208 and the processor 204 and temporarily stores data. The processor 204 can access the cache 206 faster than the memory 208. Data read from the memory 208 is stored in the cache 206. The processor 204 accesses the cache 206 before accessing the memory 208 and reads the data (including commands). The cache 206 may have a tier structure. In this case, the tiers of the tier structure are called an L1 cache, an L2 cache, and so on from the side closer to the processor. The processor 204 and the DMA controller 205 ensure coherency (consistency) with respect to the cache 206.

The information processing system 1 and the storage systems S may include components in addition to those shown above, for example, modules and interfaces for monitoring and maintenance, and nonvolatile storage apparatuses that store an operating system and software programs operating on the network interface 104.

Figure 3:
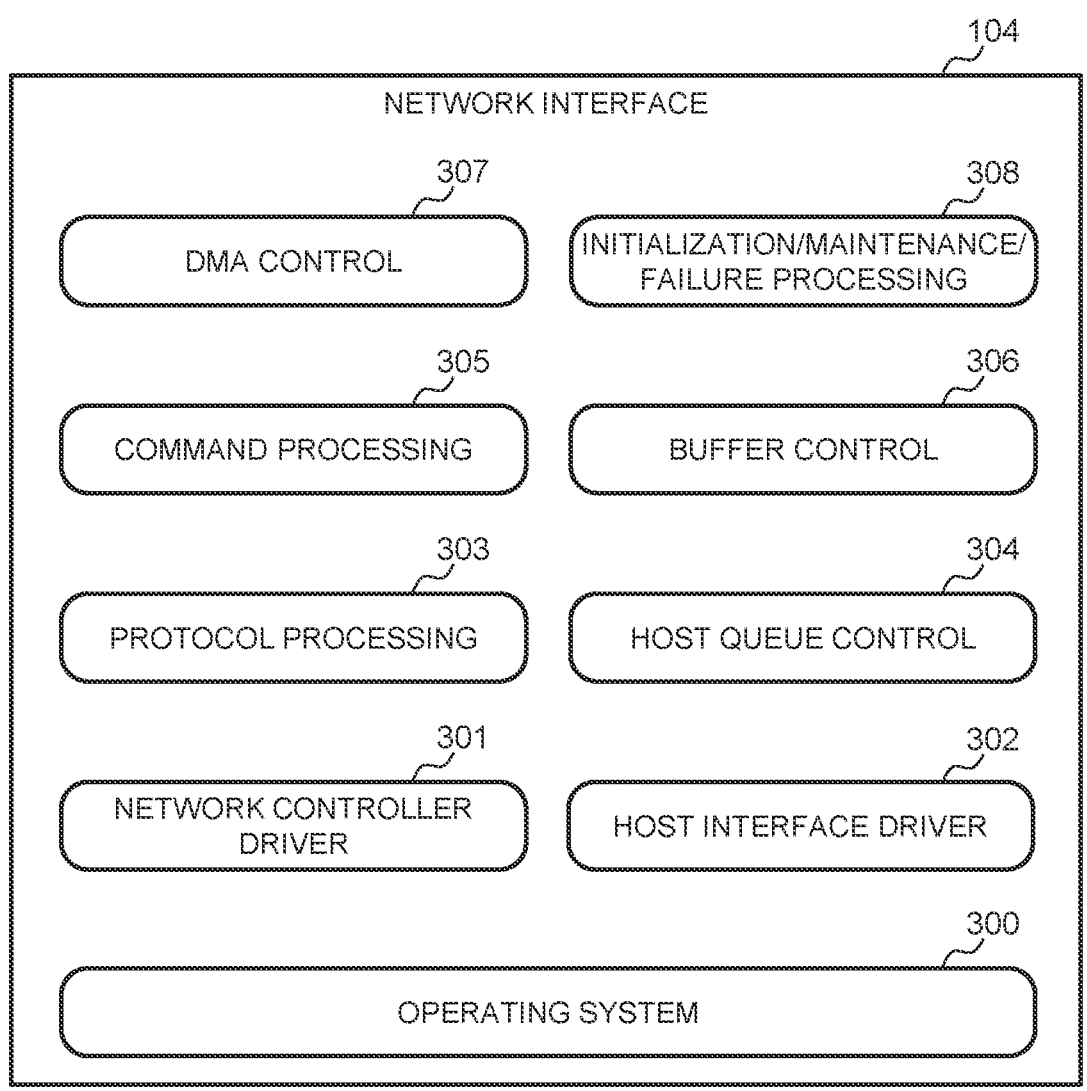
FIG. 3 shows an example of the program configuration of the network interface according to the embodiment of the present invention.

FIG. 3 shows an example of the program configuration of each of the network interfaces 104 according to the embodiment of the present invention.

To achieve software-based changeable processing functions, the network interface 104 uses the general-purpose processor 204, cache 206, and memory 208 to operate an operating system 300, on which software programs for a variety of processes operate.

The software programs are formed of the operating system 300, a network controller driver 301, a host interface driver 302, protocol processing 303, host queue control 304, command processing 305, buffer control 306, DMA control 307, and initialization/maintenance/failure processing 308. The software programs are developed in the memory 208 and executed by the processor 204. Some instructions are stored in the cache 206. Note that the DIF (data integrity field), CRC (cyclic redundancy check), encryption, compression, hashing, parity processing, and other types of processing more efficiently done in hardware may be implemented in hardware and controlled by software.

The operating system 300 is a basic software program that serves as the foundation on which the network interface operates and manages the entire network interface 104. The operating system 300 provides a usage environment common to software programs operating on the processor of the network interface 104. The operating system 300 may be an embedded operating system or a general-purpose operating system, such as one running on a server, for example, Linux (registered trademark).

The network controller driver 301 is driver software that controls the network controller 203. The network controller driver 301 passes a set of parameters used in the packet processing of performing offloading during packet generation or packet reception to the network controller 203. The network controller driver 301 further passes a packet generated by the protocol processing 303 to the network controller 203 and causes the network controller 203 to transmit the packet. The network controller driver 301 further passes a packet received from the network controller 203 to the protocol processing 303.

The host interface driver 302 is driver software that controls the host interface 207. Communication between the network interface 104 and the host is performed via the host interface driver 302.

The protocol processing 303 cooperates with the command processing 305, the DMA control 307, and the network controller driver 301 to generate a transmission packet and transmit the packet. The protocol processing 303 further processes a received packet to extract control information, information on iSCSI PDU or NVMe-oF PDU, and other pieces of information and data, and passes the extracted information to the command processing 305.

The protocol processing 303 performs IP header processing for the Internet protocol layer, TCP header processing or UDP header processing for the transport layer, and iSCSI processing or NVMe-oF processing. For example, the protocol processing 303 executes a socket program, and programs for the iSCSI initiator or the target, the NVMe-oF initiator or the target, and other programs.

The host queue control 304 is software that controls a queue interface for exchanging commands with the host.

The host queue control 304 manages an internal queue of a command to be transmitted to the host and an internal queue of a command received from the host in the network interface 104. The host queue control 304 stores the command to or from the host in the internal queue. The host queue control 304 further controls the internal queue, for example, Head and Tail when the internal queue has a ring structure. The host queue control 304 controls Head and Tail of a command queue held by the host.

The command processing 305 receives a command for controlling the network interface 104 from the host and controls the network interface 104. The command processing 305 receives a network protocol processing request from the host, activates the protocol processing 303, and gives the host the result of the processing performed by the protocol processing 303. The command processing 305 further activates the DMA control 307 to perform response processing to transfer data to and from the memory reserved by the host. The command processing 305 further changes initial settings and other settings, replaces software used in the network interface 104, notifies the host of failure, and performs other types of processing.

The buffer control 306 is software that controls the buffer that temporarily holds data in the memory 208. The buffer stores data received from a network and to be transferred to the host, or data received from the host and to be transmitted to a network.

The DMA control 307 performs DMA hardware interface processing, for example, to control data transfer between the memory reserved on the host side and the memory 208 on the network interface 104.

The initialization/maintenance/failure processing 308 initializes the hardware that forms the network interface 104 and initializes a variety of types of software. Furthermore, the initialization/maintenance/failure processing 308 supports update of the software used in the network interface 104, detection of hardware failure, and notification to the host, and other types of processing.

Figure 4:
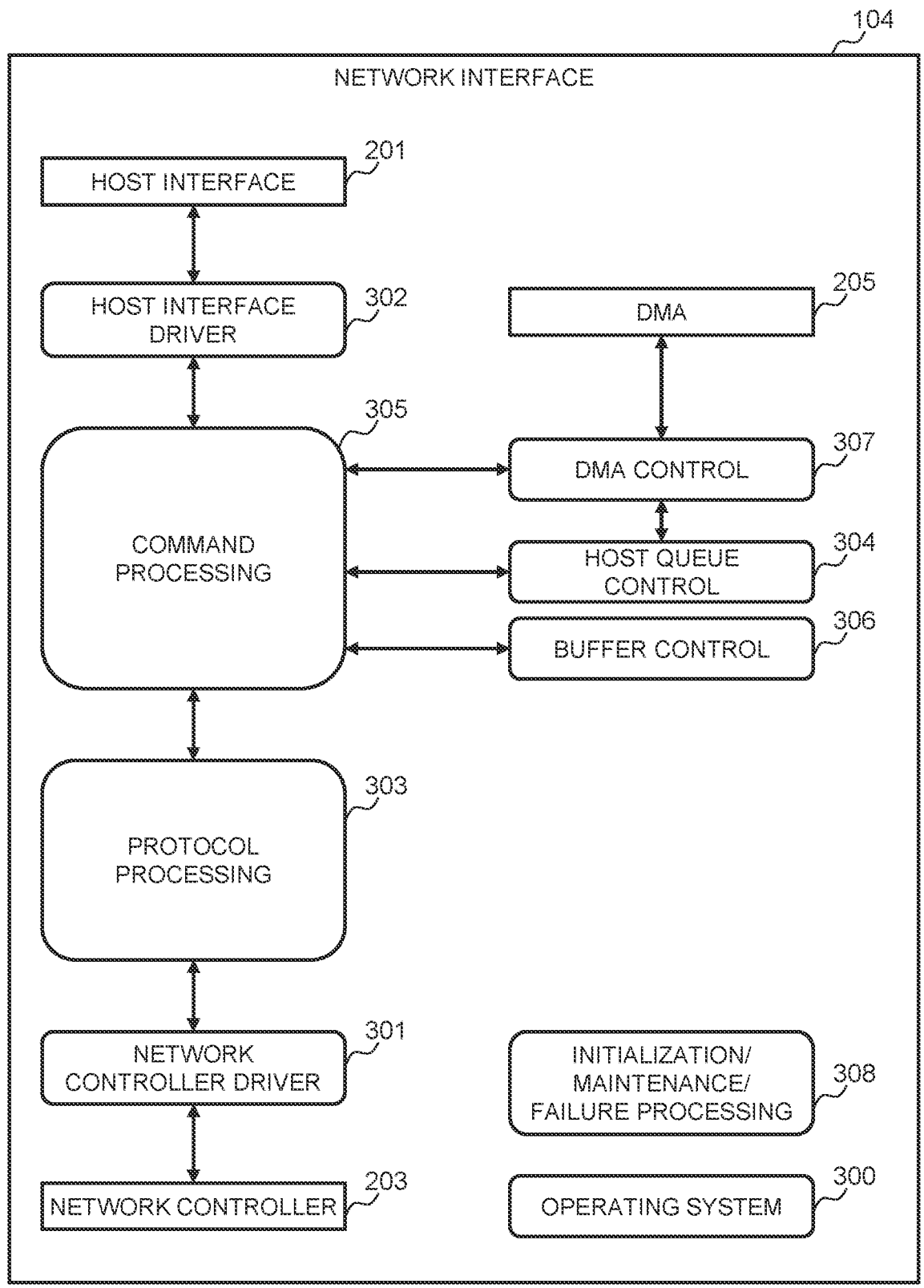
FIG. 4 shows an example of a program relating to storage interface shown in FIG. 3.

FIG. 4 shows an example of a program relating to the storage interface shown in FIG. 3.

In the network interface 104, the operating system 300 operates, based on which each software program operate. The initialization/maintenance/failure processing 308 causes the network interface 104 to perform initial settings, maintenance such as software updates, failure processing, and other types of processing. The failure processing includes, for example, failure detection, collection of dump trace information such as statistics information and error information, and log information, and other types of processing.

The network controller driver 301 controls the network controller 203, stores a packet to be transmitted in a packet buffer of the network controller 203, and acquires a received packet from that packet buffer. Furthermore, the network controller driver 301 makes settings for offloading frame processing in the data link layer, the Internet protocol layer, and the transport layer, and stateless processing, for example, checksum calculation.

Following the action of the network controller driver 301, the protocol processing 303 performs IP, TCP, UDP, or iSCSI PDU processing, NVMe-oF PDU processing, or any other type of network protocol processing. The protocol processing 303 processes a packet received from the network controller driver 301 to extract the control information, information such as iSCSI PDU or NVMe-oF PDU, and other information and data. Note that the received packet contains no data in some cases. The protocol processing 303 passes the extracted information to the command processing 305. The data can be transferred to the host via the buffer controlled by the buffer control 306 or via no buffer.

The protocol processing 303 causes the information acquired from the command processing 305 and the data transmitted by the host to be contained in the packet to be transmitted to a network. The data can be transferred to the network via the buffer controlled by the buffer control 306 or via no buffer. Note that the transmission packet contains no data in some cases.

The command processing 305 cooperates with the host queue control 304, the buffer control 306, and the DMA control 307 to perform the command processing. The command processing 305 controls the host interface 207 via the host interface driver 302. The command processing 305 transmits and receives a network communication transmission or reception command, for example, information for generating iSCSI or NVMe-oF PDU, analyzed information, or the PDU itself to and from the host system. The command is transmitted or received to and from the host system by using the queue interface. The host queue control 304 controls the queue interface.

The command processing 305 generates a command that can be processed by the host based on the result from the protocol processing 303 and stores the command in a queue via the host queue control 304. The command processing 305 further acquires a command generated by the host system from a queue, sets the functions in the network interface 104, such as the protocol processing 303, and uses the functions. Note that a command stored in a queue can be transmitted and received to and from the host system via the network interface 104 by using the DMA controller 205 via the DMA control 307.

Figure 5:
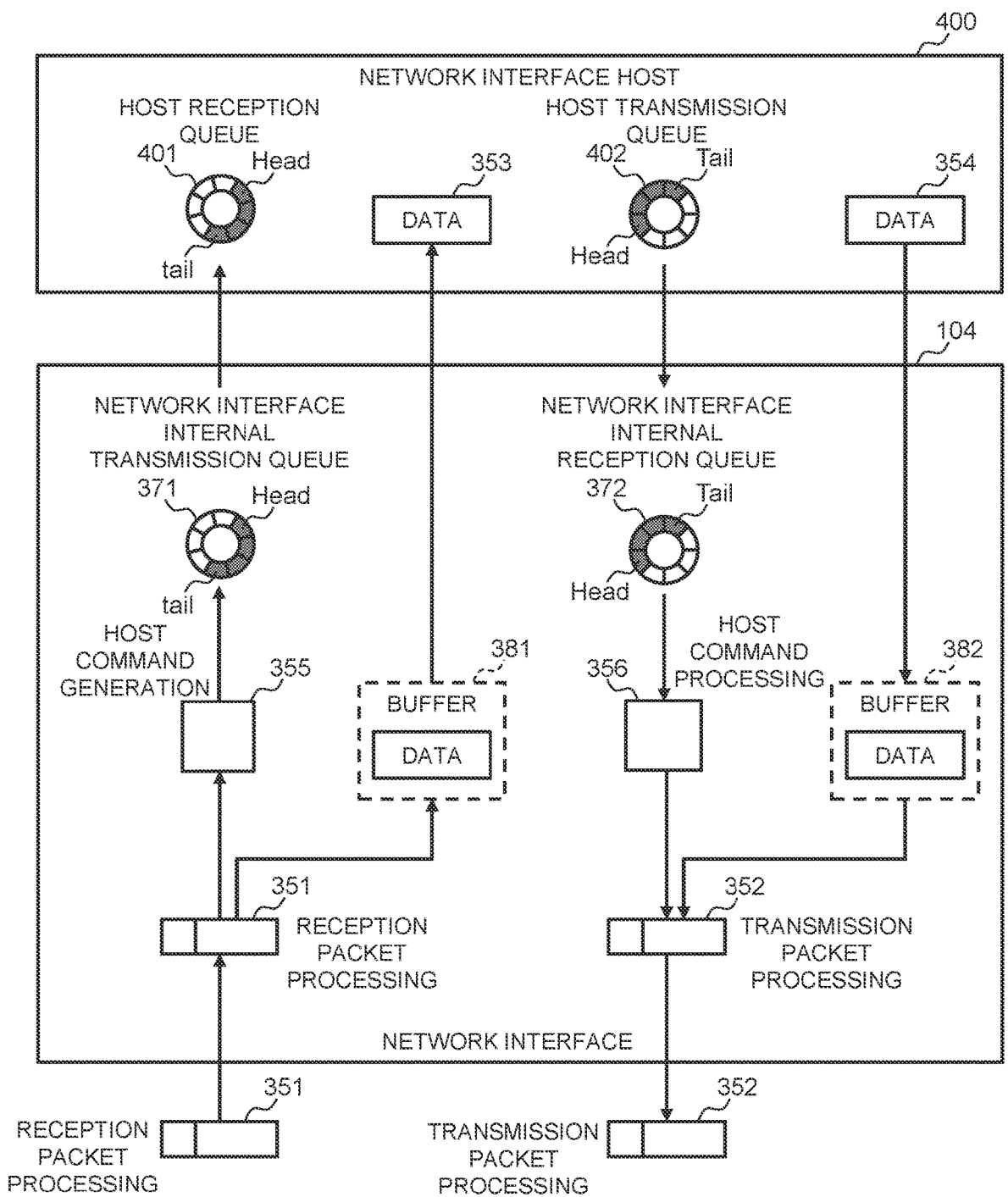
FIG. 5 describes an overview of the process in which the network interface transmits and receives commands and data to and from a host (storage controller, for example)

FIG. 5 describes an overview of the process in which the network interface 104 transmits and receives commands and data to and from a host 400 (storage controller 102, for example).

A command transmitted and received to and from the host (network interface host) 400 is hereinafter also referred to as a host command.

The network interface 104 receives a reception packet 351 from a network and allocates processing of it to any of the cores 241 (see FIG. 2). The core 241 to which the processing is allocated performs the protocol processing on the reception packet 351 to extract information and data. In the example shown in FIG. 5, the extracted data is stored in a buffer 381. The core 241 uses the information extracted from the reception packet 351 to generate a host command 355 to be transmitted to the host.

The host command 355 is stored in an internal transmission queue 371. The internal transmission queue 371 is provided for each of the cores 241, and one internal transmission queue 371 is shown in FIG. 5 by way of example. In the example shown in FIG. 5, the internal transmission queue 371 is a ring buffer (FIFO), and a new command is stored in a Tail area of the ring buffer. Head and Tail of each internal transmission queue 371 are then managed.

The network interface 104 transfers the host command 355 extracted from Head of the internal transmission queue 371 to a host reception queue 401 of the host 400. The network interface 104 further transfers data 353 stored in the buffer 381 to the host 400 in accordance with the host command 355. The host 400 is, for example, any of the storage controllers 102 or the server system 100. The host reception queue 401 is a ring buffer in the example shown in FIG. 5. The network interface 104, along with the host 400, manages Head and Tail of the host reception queue 401.

In the example shown in FIG. 5, the host commands 355 from a plurality of internal transmission queues 371 are transferred to one host reception queue 401. In another example, a plurality of host reception queues 401 may be provided. For example, host reception queues 401 which correspond to the internal transmission queues 371 and the number of which is equal to the number of internal transmission queues 371 may be used.

The host 400 stores a host command to be transferred to the network interface 104 in a host transmission queue 402. The host transmission queue 402 is a ring buffer. The network interface 104, along with the host 400, manages Head and Tail of the host transmission queue 402.

The network interface 104 transfers the command in the host transmission queue 402 to the internal reception queue 372 of the network interface 104. The internal reception queue 372 is provided for each of the cores 241, and after the host command transferred from the host is examined, a corresponding internal reception queue 372 is selected, and the host command is transferred thereto in FIG. 5. At this point, the host command can be examined by the host queue control 304 or DMA hardware. One internal reception queue 372 is presented by way of example. In the example shown in FIG. 5, a plurality of host transmission queues 402 may be provided. For example, host transmission queues 402 which correspond to the internal reception queues 372 and the number of which is equal to the number of internal reception queues 372 may be used so that the process of assigning the host commands to the internal reception queues 372 is not required.

The network interface 104 transfers data 354 stored in the buffer 381 to the host 400 in response to a host command from the host 400. The network interface 104 further transfers the data 354 stored in the memory of the host 400 to a buffer 382. The buffers 381 and 382 are controlled to improve the cache hit ratio.

Upon reception of a host command 356, which instructs transmission of a packet containing the data 354 to the network, the network interface 104 uses the host command 356 to perform the protocol processing on the data 354 to generate a transmission packet 352. The network interface 104 transmits the transmission packet 352 to the network.

Figure 6A:
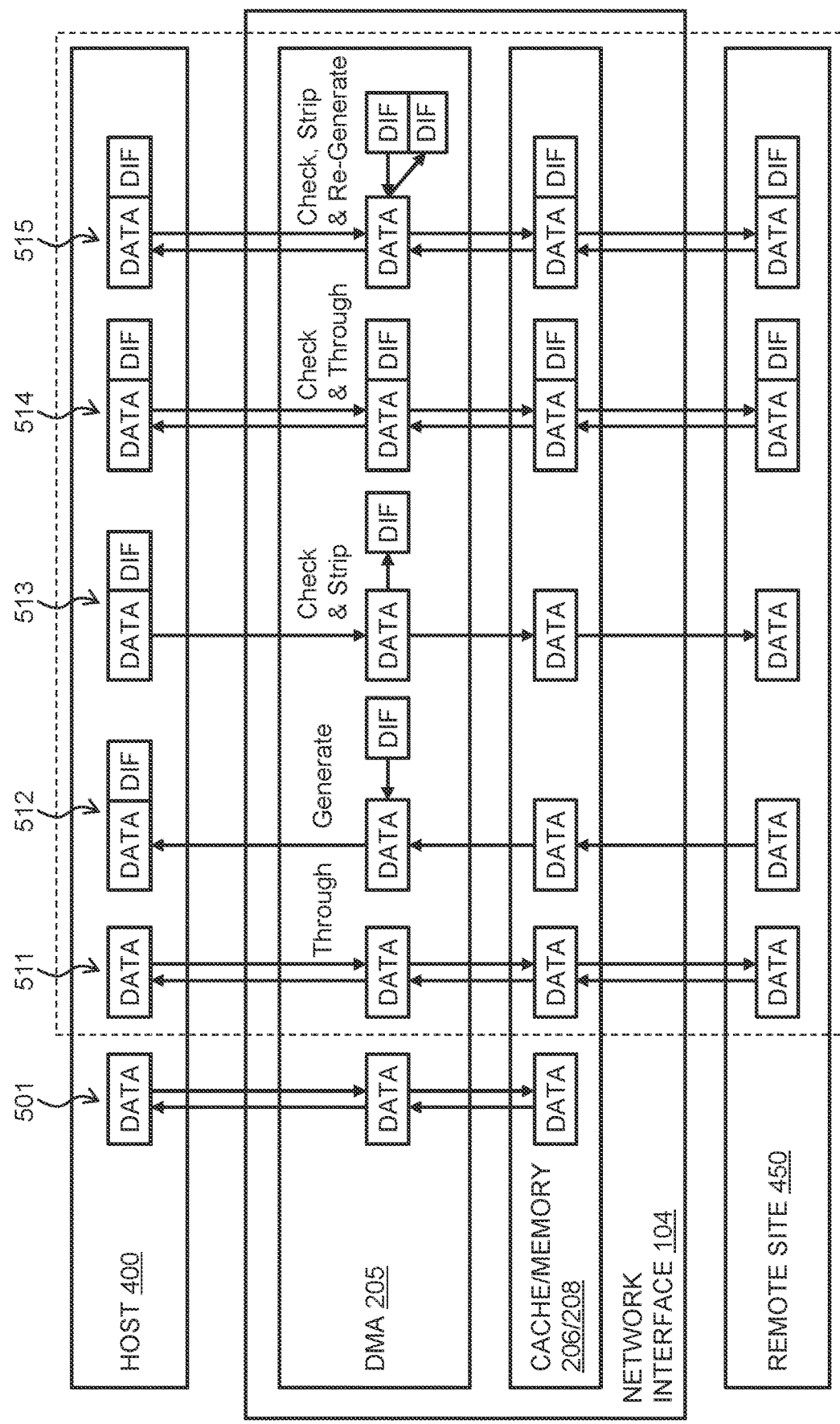
FIG. 6A describes some aspect of data transfer.
Figure 6B:
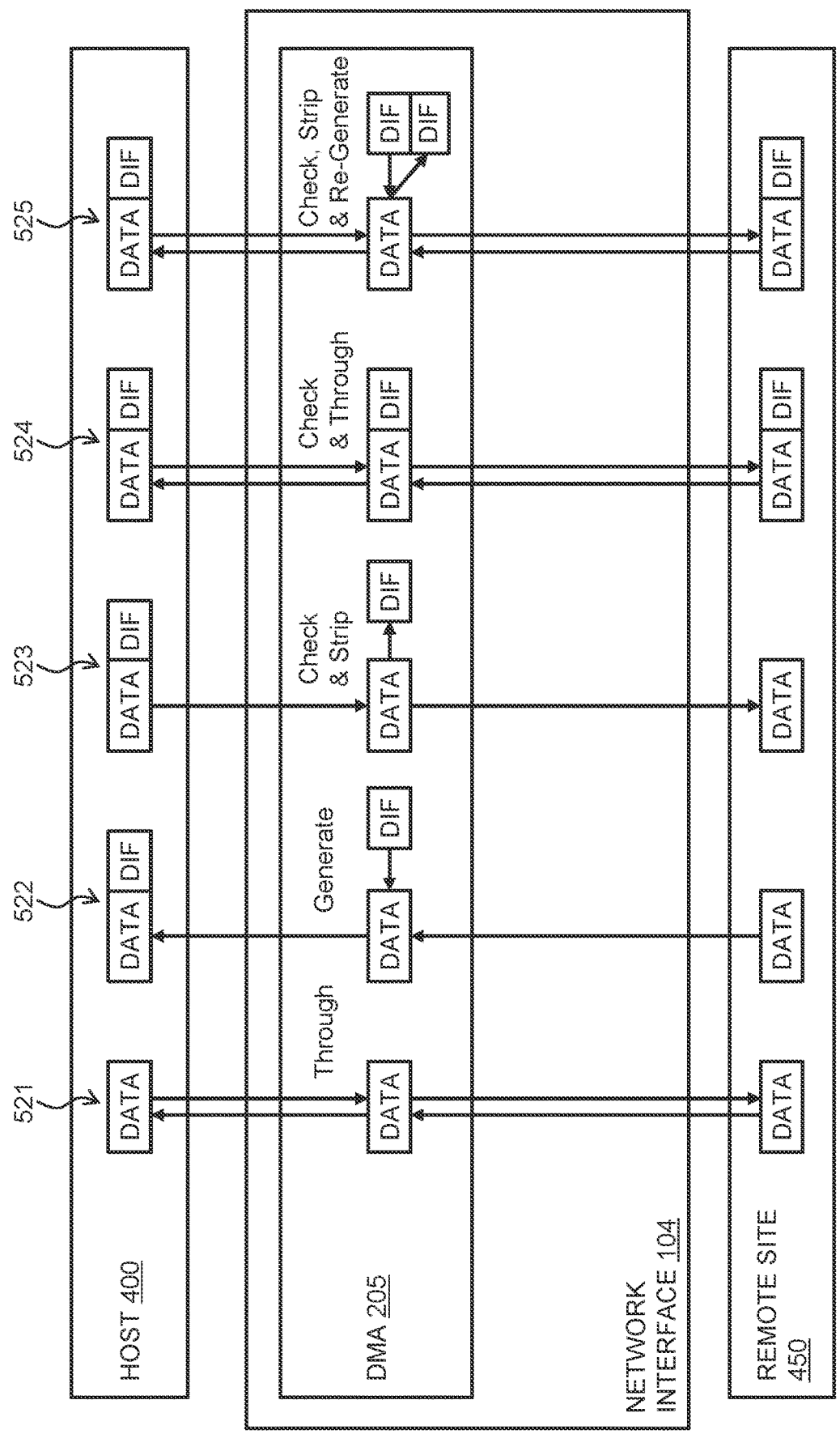
FIG. 6B describes some aspect of the data transfer.

FIGS. 6A and 6B describe some aspects of the data transfer.

FIG. 6A shows some examples of the data transfer using the cache 206/the memory 208 of the network interface 104, and FIG. 6B shows some examples of the data transfer using no cache 206/memory 208. The data transfer is performed by using the DMA controller 205. The network interface 104 may support all the data transfer shown in FIGS. 6A and 6B, or may support only part of the data transfer, for example, the data transfer shown in FIG. 6A.

FIG. 6A shows the data transfer via the cache/memory of the network interface 104. This corresponds, for example, to data transfer using iSCSI or NVMe TCP.

In FIG. 6A, data transfer 501 is performed between the host 400 and the cache 206/memory 208 of the network interface 104. No error checking or warranty code assignment or stripping is performed in the data transfer 501. The data transfer 501 corresponds, for example, to transfer of updated data for a program operating on the network interface 104 or a command to be transferred via a queue.

Data transfer 511 is performed between the host 400 and a remote site 450 via the cache 206/memory 208 of the network interface 104. No error checking or warranty code assignment or stripping is performed in the data transfer 511.

Data transfer 512 is performed from the remote site 450 to the host 400 via the cache 206/memory 208 of the network interface 104. The DMA controller 205 assigns a data integrity field (DIF) to data from the remote site 450 and transfers the resultant data to the host 400. Information for generating the DIF is acquired from the host 400.

Data transfer 513 is performed from the host 400 to the remote site 450 via the cache 206/memory 208 of the network interface 104. The DMA controller 205 performs data checking by referring to the DIF assigned to data from the host 400, and strips the DIF from the data. The data from which the DIF has been stripped is transferred to the remote site 450.

Data transfer 514 is performed between the host 400 and a remote site 450 via the cache 206/memory 208 of the network interface 104. The DIF has been assigned to data to be transferred. The DMA controller 205 performs error checking by referring to the DIF assigned to the data.

Data transfer 515 is performed between the host 400 and a remote site 450 via the cache 206/memory 208 of the network interface 104. The DIF has been assigned to data to be transferred. The DMA controller 205 performs error checking by referring to the DIF assigned to the data, strips the DIF, and assigns a new DIF to the data.

FIG. 6B shows the data transfer via no cache/memory of the network interface 104. For example, the data transfer corresponds, for example, to RDMA (remote direct memory access).

Data transfer 521 is performed between the host 400 and the remote site 450. No error checking or warranty code assignment or stripping is performed in the data transfer 521. Data transfer 522 is performed from the remote site 450 to the host 400. The DMA controller 205 assigns a data integrity field (DIF) to data from the remote site 450 and transfers the resultant data to the host 400.

Data transfer 523 is performed from the host 400 to the remote site 450. The DMA controller 205 performs data checking by referring to the DIF assigned to data from the host 400, and strips the DIF from the data. The data from which the DIF has been stripped is transferred to the remote site 450.

Data transfer 524 is performed between the host 400 and the remote site 450. The DIF has been assigned to data to be transferred. The DMA controller 205 performs error checking by referring to the DIF assigned to the data. Data transfer 525 is performed between the host 400 and the remote site 450. The DIF has been assigned to data to be transferred. The DMA controller 205 performs error checking by referring to the DIF assigned to the data, strips the DIF, and assigns a new DIF to the data.

The network interface 104 creates and manages a plurality of buffers in the memory 208. The buffers are each managed by a corresponding buffer list. The buffer list contains information necessary when the buffer is used.

The buffer lists each contain buffer list management information and a plurality of buffer entries. The buffer entries each indicate information on the corresponding buffer.

FIG. 7A shows the buffer list management information contained in each of the buffer lists.

Buffer list management information 750 shown in FIG. 7A holds information for managing the buffer lists. The buffer list management information 750 contains a buffer entry head address 751 and an active buffer count 752. The buffer entry head address 751 represents the address of the first entry in the buffer list. The active buffer count 752 represents the number of buffer entries currently in use.

FIG. 7B shows information held by a buffer entry.

A buffer entry 703 shown in FIG. 7B includes a buffer entry address 761, a buffer address 762, and a next buffer entry address 763.

The buffer entry address 761 represents the address of the buffer entry 703. Note that the field where the buffer entry address 761 is stored may not be used, and the memory address where the buffer entry address 761 is stored may be directly used as the buffer entry address 761. The buffer address 762 is an address, in the memory 208, of the buffer managed by the buffer entry 703. The next buffer entry address 763 is the address of the buffer entry 703 next to the current buffer entry 703.

The buffers are managed by a buffer management table.

FIG. 7C shows an example of the configuration of a buffer management table 770.

The buffer management table 770 shows information for managing the buffers and is generated by the network interface 104. The buffer management table 770 allows a dynamical change in each of the buffers. Specifically, the buffer management table 770 shows the buffer entry 703, a buffer size 771, the buffer address 762, an allocation status 772, and a buffer entry count 773.

The buffer size 771 represents the size of the buffer. The buffer entry count 773 represents the number of buffers managed by the buffer list, that is, the number of buffer entries. The allocation status 772 represents the status of buffer allocation, that is, whether the buffer has been already allocated or whether the buffer has not yet been allocated so that the buffer is available.

Figure 8:
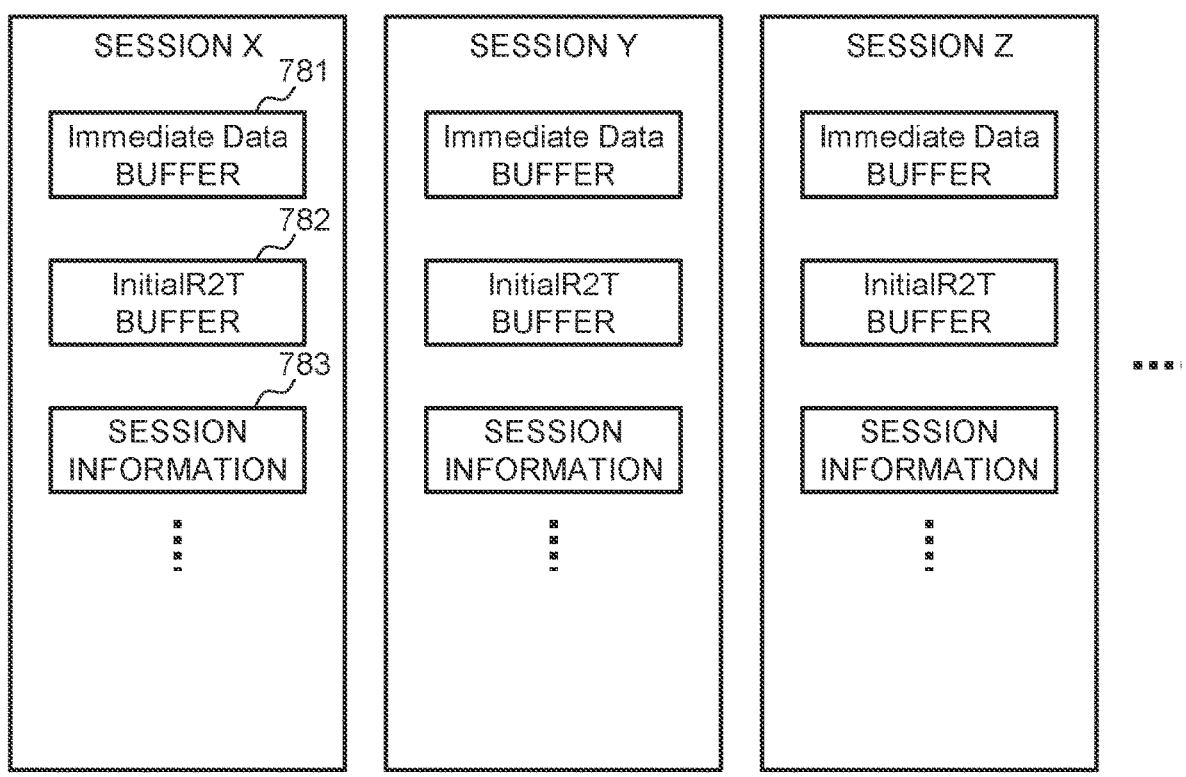
FIG. 8 shows the configuration of buffers allocated for each session.

FIG. 8 shows the configuration of buffers allocated for each session.

FIG. 8 shows a case where the write data transfer has been performed in the form of three sessions, sessions X, Y, and Z.

In this case, an Immediate Data buffer 781 and an InitialR2T buffer 782 are allocated to each of the sessions X, Y, and Z. The sessions X, Y, and Z each contain session information 783.

The Immediate Data buffer 781 is an example of a first buffer and is a buffer used in Immediate Data transfer.

The InitialR2T buffer 782 is an example of a second buffer and is a buffer used when no initialR2T is used. Although it will be described later in more detail, the network interface 104 provides the InitialR2T buffer 782 even in the Immediate Data transfer. A case where no Immediate Data transfer is performed is a case where write data is transferred by using a normal transfer scheme. That is, the case where no Immediate Data transfer is performed is a case where the packet processing is performed on the write command, Ready to Transfer (R2T), write data, and write response to transfer the write data.

The session information 783 contains, for example, a session ID, identification information for identifying the server system 100 that transfers write data, and the time of the transfer.

<Description of Action of Information Processing System 1>

Figure 9A:
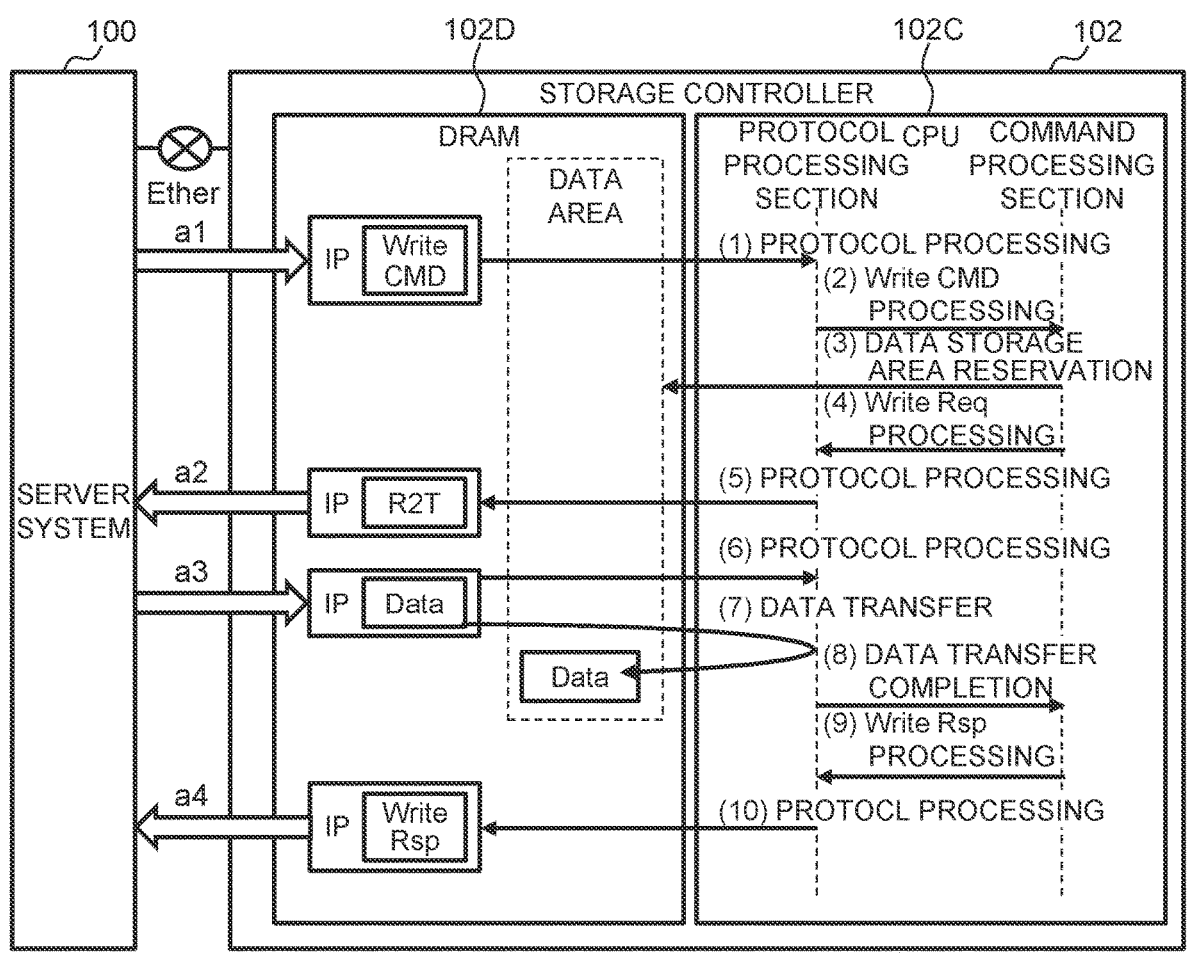
FIG. 9A describes an overview of the action of the information processing system.
Figure 9B:
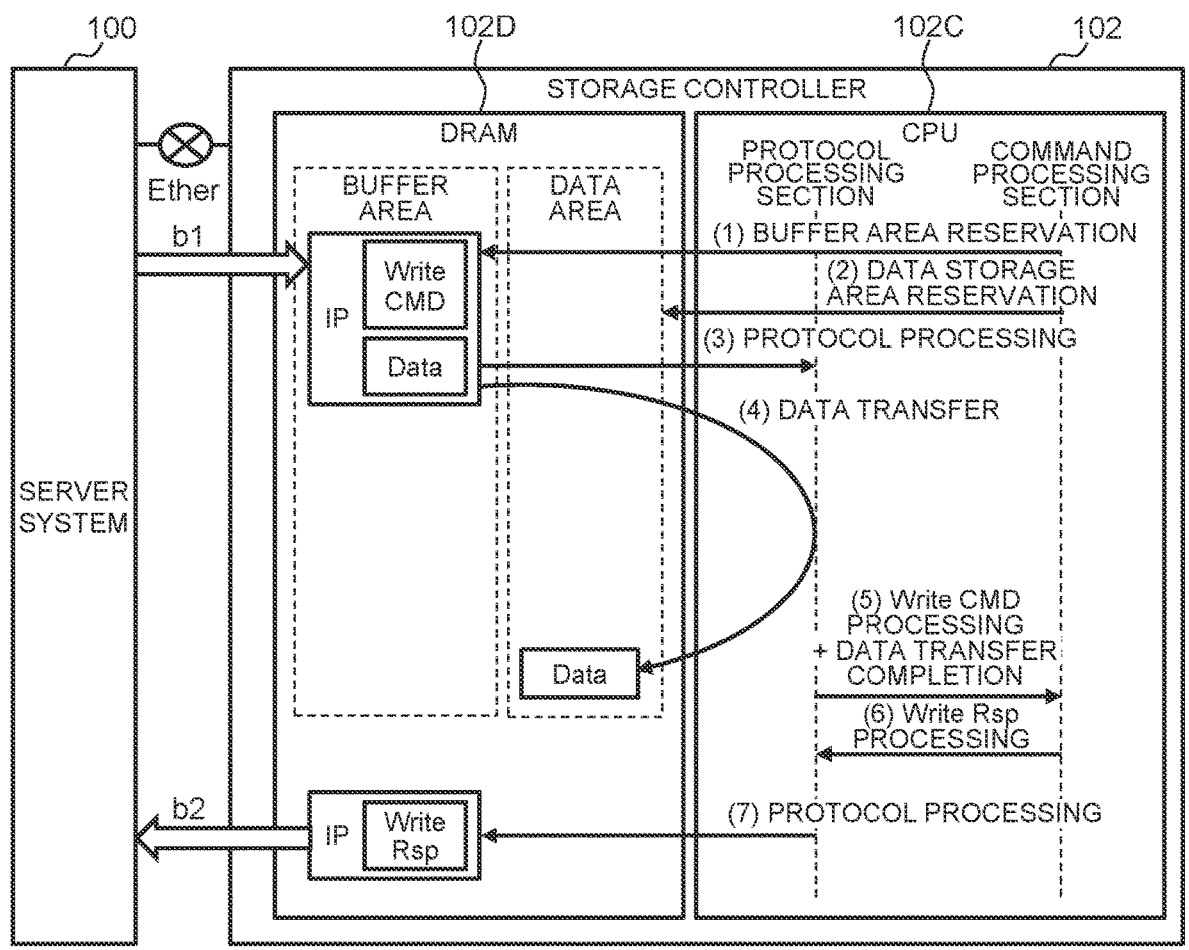
FIG. 9B describes an overview of the action of the information processing system.
Figure 9C:
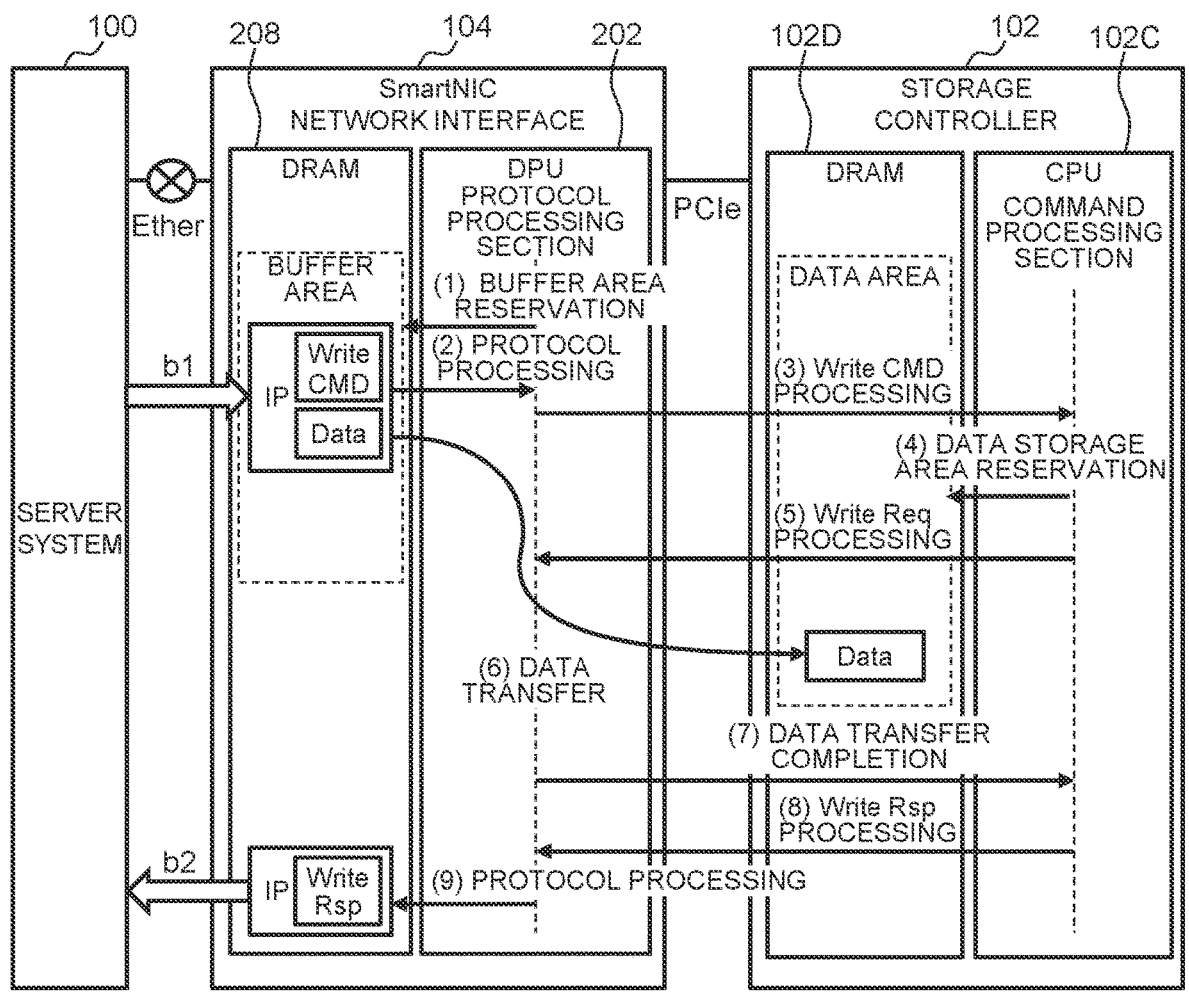
FIG. 9C describes an overview of the action of the information processing system.

FIGS. 9A to 9C describe an overview of the action of the information processing system 1.

Out of these figures, FIG. 9A shows transmission and reception of commands and data between the server system 100 and any of the storage controllers 102 in the case where no Immediate Data transfer is performed. FIG. 9B shows the transmission and reception of commands and data between the server system 100 and any of the storage controllers 102 in the case where the Immediate Data transfer is performed.

FIGS. 9A and 9B show a case where the network interface 104 in the present embodiment is not used. That is, FIGS. 9A and 9B show a write data transfer scheme of related art.

On the other hand, FIG. 9C shows the case where the network interface 104 in the present embodiment is used to perform the Immediate Data transfer. In this case, FIG. 9C shows the transmission and reception of commands and data between the server system 100 and the storage controller 102 via the network interface 104. That is, FIG. 9C shows a write data transfer scheme to which the present embodiment is applied.

In FIG. 9A, in which no Immediate Data transfer is performed, the write data is transferred by using the normal transfer scheme. That is, the following four types of packet processing are sequentially performed between the server system 100 and the storage controller 102: (a1) write command (Write CMD); (a2) Ready to Transfer (R2T); (a3) write data (DATA); and (a4) write response (Write Rsp).

In this case, when the storage controller 102 receives (a1) the write command (Write CMD) from the server system 100, a CPU 102C of the storage controller 102 performs (1) the protocol processing on the write command (Write CMD) and (2) write command (Write CMD) processing. The CPU 102C then (3) reserves a data storage area in a DRAM 102D. The CPU 102C further (4) performs write request (Write Req) processing. In the write request (Write Req) processing, (5) the protocol processing is performed on the write request (Write Req) by the CPU 102C, and the write request (Write Req) is transferred as (a2) Ready to Transfer (R2T) to the server system 100.

The server system 100 having received of the write request (Write Req) transfers the write data to the storage controller 102 ((a3) Write Data (DATA)). (6) The protocol processing is performed on the write data by the CPU102C, and (7) the data is transferred to the data area of the DRAM 102D.

Thereafter, when (8) the data transfer is completed, the CPU 102C (9) performs write response (Write Rsp) processing. In the write request (Write Rsp) processing, (10) the protocol processing is performed on the write request (Write Rsp) by the CPU 102C, and the write request (Write Rsp) is transferred as (a4) the write response (Write Rsp) to the server system 100.

In this case, the load on the DRAM 102D and the CPU 102C of the storage controller 102 increases.

In FIG. 9B, the Immediate Data transfer is performed. In this case, the following two types of packet processing are sequentially performed between the server system 100 and the storage controller 102: packet processing labeled with (b1) write command (Write CMD) & write data (DATA); and packet processing labeled with (b2) write response (Write Rsp).

In this case, the storage controller 102 receives (b1) the write command (Write CMD) & write data (DATA) from the server system 100. That is, the server system 100 sends both the write command (Write CMD) and the write data (DATA) to the storage controller 102. In this case, the CPU 102C of the storage controller 102 reserves in advance in the DRAM 102D (1) a buffer area for temporarily storing the write data, and (2) the data area. The CPU 102C then (3) performs the protocol processing on the write data and (4) transfers the data to the data area.

The CPU 102C then (5) performs the write command (Write CMD) processing, and when the data transfer is completed, the CPU 102C (6) performs the write response (Write Rsp) processing. In the write response (Write Rsp) processing, (7) the protocol processing is performed on the write response (Write Rsp) by the CPU 102C, and (b2) the write response (Write Rsp) is transferred as a write response (Write Rsp) to the server system 100.

In this case, the load on the CPU 102C of the storage controller 102 decreases as compared with that shown in FIG. 9A. The load on the DRAM 102D is, however, as large as that shown in FIG. 9A.

Furthermore, in FIG. 9C, the Immediate Data transfer is performed. The network interface 104 in the present embodiment is used in the data transfer. In this case, the following two types of packet processing are sequentially performed: packet processing labeled with (b1) write command (Write CMD) & write data (DATA); and packet processing labeled with (b2) write response (Write Rsp), as in FIG. 9B.

In this case, the network interface 104 (b1) receives the write command (Write CMD, write request) & the write data from the server system 100. That is, the server system 100 sends both the write command (Write CMD) and the write data (DATA) to the network interface 104. In this case, the DPU 202 of the network interface 104 (1) reserves in advance in the memory (DRAM) 208 a buffer area for temporarily storing the write data. The DPU 202 then (2) performs the protocol processing on the write command (Write CMD), and further (3) performs the write command (Write CMD) processing (transfer and reception of write command) on the storage controller 102. In the storage controller 102, the CPU 102C (4) reserves a data area in the DRAM 102D (reserves storage area for data storage in cache memory). Furthermore, the CPU 102C (5) performs the write request (Write Req, data transfer request) processing on the network interface 104. The DPU 202 of the network interface 104 then performs the protocol processing on the write data and (6) transfers the data to the data area of the storage controller 102.

Thereafter, when (7) the data transfer is completed, the CPU 102C of the storage controller 102 (8) performs write response (Write Rsp, write response) processing. In this process, when the storage controller 102 performs a predetermined process, for example, any of making the data stored in the cache memory involatile, duplicating the data, and storing the data in the storage drive, the storage controller 102 transfers the write response. In the write response (Write Rsp) processing, (9) the protocol processing is performed on the write response (Write Rsp) by the DPU 202, and (b2) the write response (Write Rsp) is transferred as a write response (Write Rsp) to the server system 100.

Comparison between FIGS. 9B and 9C shows that the write command (Write CMD) and the write data are both received by the storage controller 102 in FIG. 9B, and that they are both received by the network interface 104 in FIG. 9C. This corresponds in FIG. 9C to the process of (b1) receiving the write command (Write CMD) & the write data (DATA).

The network interface 104 performs the protocol processing and the write data transfer processing in place of the storage controller 102. This corresponds in FIG. 9C to (2) the protocol processing of the write command (Write CMD), and (6) the process of transferring data to the data area of the storage controller 102. It can also be said that this corresponds to offloading the protocol processing and the write data transfer processing performed by the storage controller 102 to the network interface 104.

The load on the CPU 102C of the storage controller 102 in association with the Immediate Data transfer can thus be reduced.

Furthermore, when the data transfer is completed, the write response is sent to the server system 100 by the storage controller 102 in FIG. 9B, whereas the write response is sent by the network interface 104 in FIG. 9C.

Furthermore, when the write data is received from the server system 100, the buffer that temporarily stores the write data belongs to the storage controller 102 in FIG. 9B, whereas the buffer belongs to the network interface 104 in FIG. 9C. It can therefore be further said that the buffer of the network interface 104 is provided in place of the buffer required when the storage controller 102 receives both the write commands (Write CMD) and the write data from the server system 100 in the case where the network interface 104 (apparatus to which buffer belongs) is not coupled. It can be still further said that the buffer of the storage controller 102 is offloaded to the network interface 104.

In usual Immediate Data transfer shown in FIG. 9B, a large number of memories in the storage controller need to be allocated in advance for write data transfer. A storage controller 102 coupled to a large number of server systems 100 therefore causes a decrease in the amount of allocated memory necessary for the primary processing performed by the storage controller 102, such as allocation of memory to the data cache. In contrast, the present embodiment, in which the buffer of the storage controller 102 is offloaded to the network interface 104, the amount of memory, in the storage controller 102, required for the Immediate Data transfer can be reduced.

In addition to the reduction in the load on the CPU of the storage controller and the reduction in the amount of memory thereof, the present embodiment allows the memory access load to be removed from the storage controller 102 but given to the network interface 104, whereby Immediate Data transfer can be more efficiently performed.

In this case, the load on the DRAM 102D and the CPU 102C of the storage controller 102 is smaller than that shown in FIGS. 9A and 9B. In addition to the reduction in the load on the CPU 102C of the storage controller 102 and the reduction in the amount of memory of the DRAM 102D associated with the Immediate Data transfer, the memory access load can also be given to the network interface 104. The Immediate Data processing is therefore more efficiently performed. As a result, the rate at which write data is transferred from the server system 100 to the storage controller 102 is improved. The write performance is therefore improved.

Furthermore, comparison between FIGS. 9A and 9C shows that the data processing sequence in FIG. 9A performed between the protocol processing section and the command processing section of the storage controller 102 is similar to the data processing sequence in FIG. 9C performed between the protocol processing section of the network interface 104 and the command processing section of the storage controller 102.

That is, (2) the write command (Write CMD) processing, (3) the process of reserving a data storage area in the DRAM 102D, (4) the write request (Write Req) processing, (8) completion of the data transfer, and (9) the write response (Write Rsp) processing in FIG. 9A are the similar to (3) the write command (Write CMD) processing, (4) the process of reserving a data area, (5) the write request (Write Req) processing, (7) completion of the data transfer, and (8) the write response (Write Rsp) processing in FIG. 9C.

The protocol processing section of the storage controller 102 generates a transmission packet and transmits the transmission packet. The protocol processing section of the network interface 104 corresponds, for example, to the protocol processing 303 (see FIG. 3) and generates a transmission packet and transmits the transmission packet. The command processing section of the storage controller 102 receives a command and controls the storage controller 102.

As described above, in the present embodiment, the network interface 104 is used to perform the protocol processing and the write data transfer processing in place of the storage controller 102. As a result, when the network interface 104 is not used, the data processing sequence performed between the protocol processing section and the command processing section of the storage controller 102 is made similar to the data processing sequence performed between the protocol processing section of the network interface 104 and the command processing section of the storage controller 102.

In this case, in the present embodiment, the data processing sequence viewed from the storage controller 102 is the same both in the scheme of related art shown in FIG. 9A and the Immediate Data transfer scheme using the network interface 104 in FIG. 9C. That is, the Immediate Data transfer to the server system 100 is hidden by the network interface 104, and the storage controller 102 does not know whether the Immediate Data transfer is performed. Therefore, for example, even the storage controller 102 having undergone a strict memory design and therefore unable to provide a buffer used to perform the Immediate Data transfer can perform the Immediate Data transfer while maintaining compatibility with interfaces of related art. That is, simply introducing the network interface 104 in the present embodiment with no change made to the storage controller 102 having been installed allows construction of the information processing system 1 capable of the Immediate Data transfer. It can further be said in this case that the storage controller 102 can perform the Immediate Data transfer even when the storage controller 102 does not support the Immediate Data transfer.

In the present embodiment, a SmartNIC (smart network interface card) is, for example, used as the network interface 104. The SmartNIC includes a memory (in this case, memory (DRAM) 208 described above), and the buffer can be realized by using the memory. In the case of the SmartNIC, the protocol processing is performed by a general-purpose processor (in this case, DPU 202 described above) provided in the SmartNIC. Using the SmartNIC therefore allows the protocol processing and the data transfer processing to be achieved by software processing performed by the processor provided in the SmartNIC.

The aforementioned example has been described with reference to the network interface 104 disposed on the storage controller 102 side, which receives the write data from the server system 100, but not necessarily. The network interface 104 in the present embodiment can be preferably used when disposed in a target-side instrument. That is, in addition to the aforementioned case where the network interface 104 is disposed in the storage controller 102, which receives write data from the server system 100, the network interface 104 disposed in the drive box 105, which receives write data from the storage controller 102, can still be preferably used. In this case, when the network interface 104 that transfers the write data is the initiator and the network interface 104 that receives the write data is the target, it can be further said that the network interface 104 disposed in the target, which receives the write data from the initiator, can be preferably used. In this case, it can further be said that the network interface 104 is incorporated in the target and receives the write command and write data from the initiator via a network. The target corresponds to the host of the network interface 104 described above.

The network interface 104 in the present embodiment is not only used in the Immediate Data transfer scheme shown in FIG. 9C but in a typical transfer scheme different from the Immediate Data transfer scheme shown in FIG. 9A. That is, the network interface 104 in the present embodiment can also be used with the two transfer schemes switched from one to the other.

Including the item described above, the process of transferring write data via the network interface 104 will be described below in more detail.

<Detailed Description of Action of Information Processing System 1>

FIGS. 10 to 13 are sequence diagrams for describing in more detail process of transferring write data via the network interface 104.

FIGS. 10 to 13 show the case where write data is transferred from the initiator to the target (host of network interface 104) via the network interface 104. The initiator is, for example, the server system 100, and the target is, for example, the storage controller 102. The target is also shown in the description as the network interface host.

Out of FIGS. 10 to 13, FIG. 10 shows the case where write data is transferred in a typical transfer scheme different from the Immediate Data transfer.

First, the network interface 104 performs event polling to check whether or not a write command (Write command) has been issued from the initiator (step S101).

Thereafter, when the initiator transmits a write command (iSCSI command PDU (Write command)), the network interface 104 receives the write command (step S102). The network interface 104 performs the PDU processing on the write command (Write command) as the protocol processing (step S103) and receives an I/O request (step S104). In the description, the network interface 104 performs the iSCSI protocol processing.

The network interface 104 then generates a host command as the host command processing to be performed on the target (step S105). Furthermore, the network interface 104 sends the host command (SCSI Command receipt) to the target, and the target receives the host command (step S106).

The target activates a job (step S107) and prepares for data transfer (step S108). The preparation for data transfer includes, for example, resource reservation and host command generation. The target then sends a host command (Write transfer request) to the network interface 104, and the network interface 104 receives the host command (step S109).

Furthermore, the network interface 104 performs the R2T issuance processing (step S110) and makes an R2T reply request (step S111). The network interface 104 then generates a PDU as the protocol processing (step S112).

The network interface 104 then transmits Ready to Transfer (R2T) to the initiator, and the initiator then receives Ready to Transfer (R2T) (step S113).

The initiator then transmits the write data to the network interface 104 (write data transmission (Data-Out)), and the network interface 104 receives the write data (step S114).

The network interface 104 performs the PDU processing on the write data (Write data) as the protocol processing (step S115) and receives the write data (Write data) (step S116).

The network interface 104 then starts the process of transferring the write data (Write data) to the target (step S117), and the write data (Write data) is transferred to the target (Write data transfer (DMA transfer)) (step S118).

The network interface 104 generates a host command as the host command processing to be performed on the target (step S119). Furthermore, the network interface 104 sends a host command (Write transfer response) to the target, and the target receives the host command (step S120).

The target then generates a data transfer response (step S121). The target then sends a host command (SCSI Response request) to the network interface 104, and the network interface 104 receives the host command (step S122).

Furthermore, the network interface 104 performs Response issuance processing (step S123) and makes a Response transmission request (step S124). The network interface 104 then generates a PDU as the protocol processing (step S125).

The network interface 104 then transmits a write response (iSCSI Response PDU (Write Response)) to the initiator, and the initiator receives the write response (step S126).

Furthermore, the network interface 104 completes the transmission of Response (step S127). The network interface 104 generates a host command as the host command processing to be performed on the target (step S128). Furthermore, the network interface 104 sends a host command (SCSI Response completion) to the target, and the target receives the host command (step S129). The target terminates the job and releases the resources (step S130).

Figure 11:
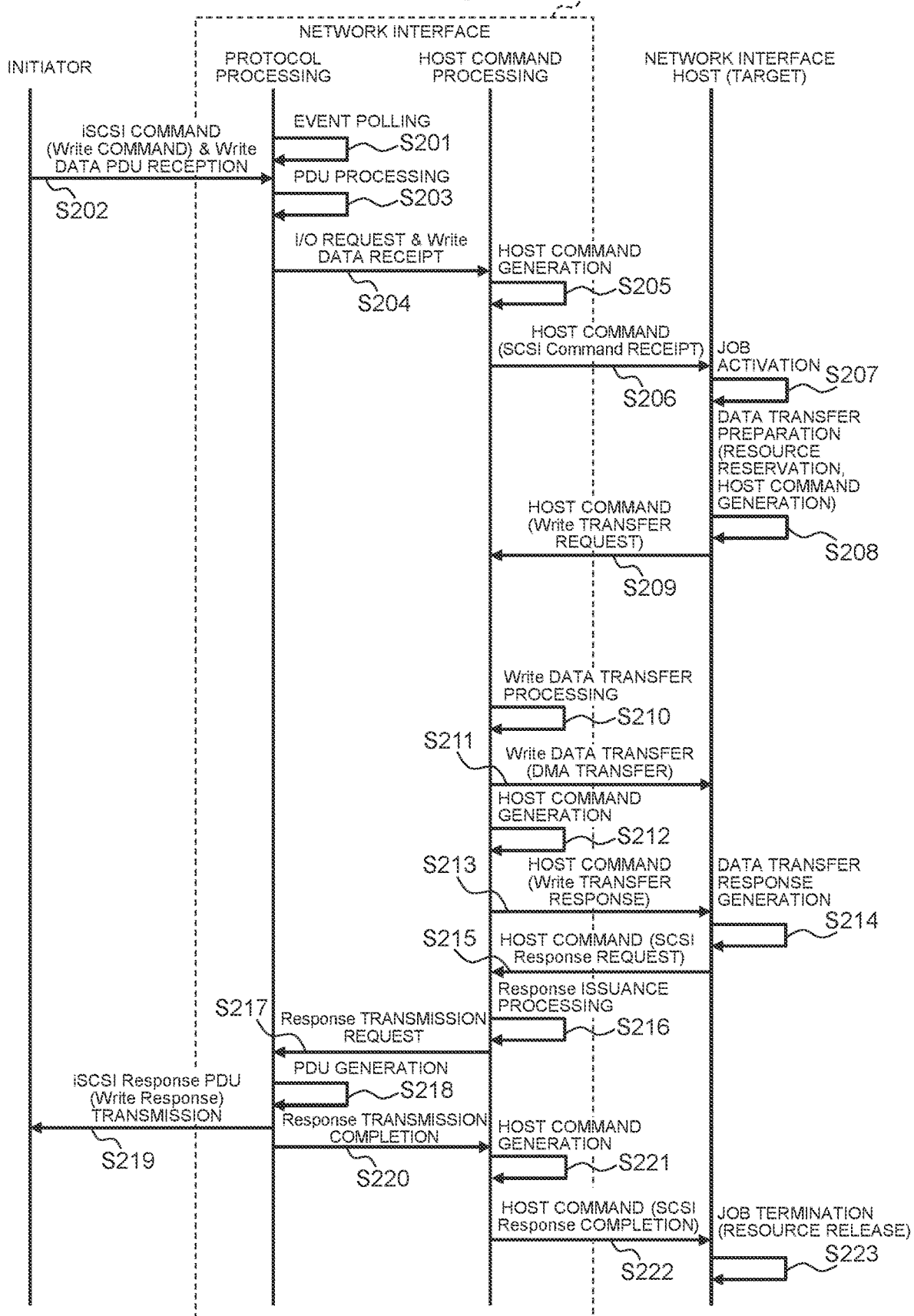
FIG. 11 shows a case where write data is transferred in the Immediate Data transfer scheme.

FIG. 11 shows the case where write data is transferred in the Immediate Data transfer scheme.

First, the network interface 104 performs event polling to check whether or not a write command (Write command) and write data (Write data) have been issued from the initiator (step S201).

Thereafter, when the initiator transmits a write command (iSCSI command PDU (Write command)) and write data (Write data PDU reception), the network interface 104 receives the write command and the write data (step S202). The network interface 104 performs the PDU processing on the write command (Write command) and the write data (Write data) as the protocol processing (step S203) and receives the I/O request and the write data (Write data) (step S204).

The network interface 104 then generates a host command as the host command processing to be performed on the target (step S205). Furthermore, the network interface 104 sends the host command (SCSI Command receipt) to the target, and the target receives the host command (step S206).

The target activates a job (step S207) and prepares for data transfer (step S208). The preparation for data transfer includes, for example, resource reservation and host command generation. The target then sends a host command (Write transfer request) to the network interface 104, and the network interface 104 receives the host command (step S209).

Figure 10:
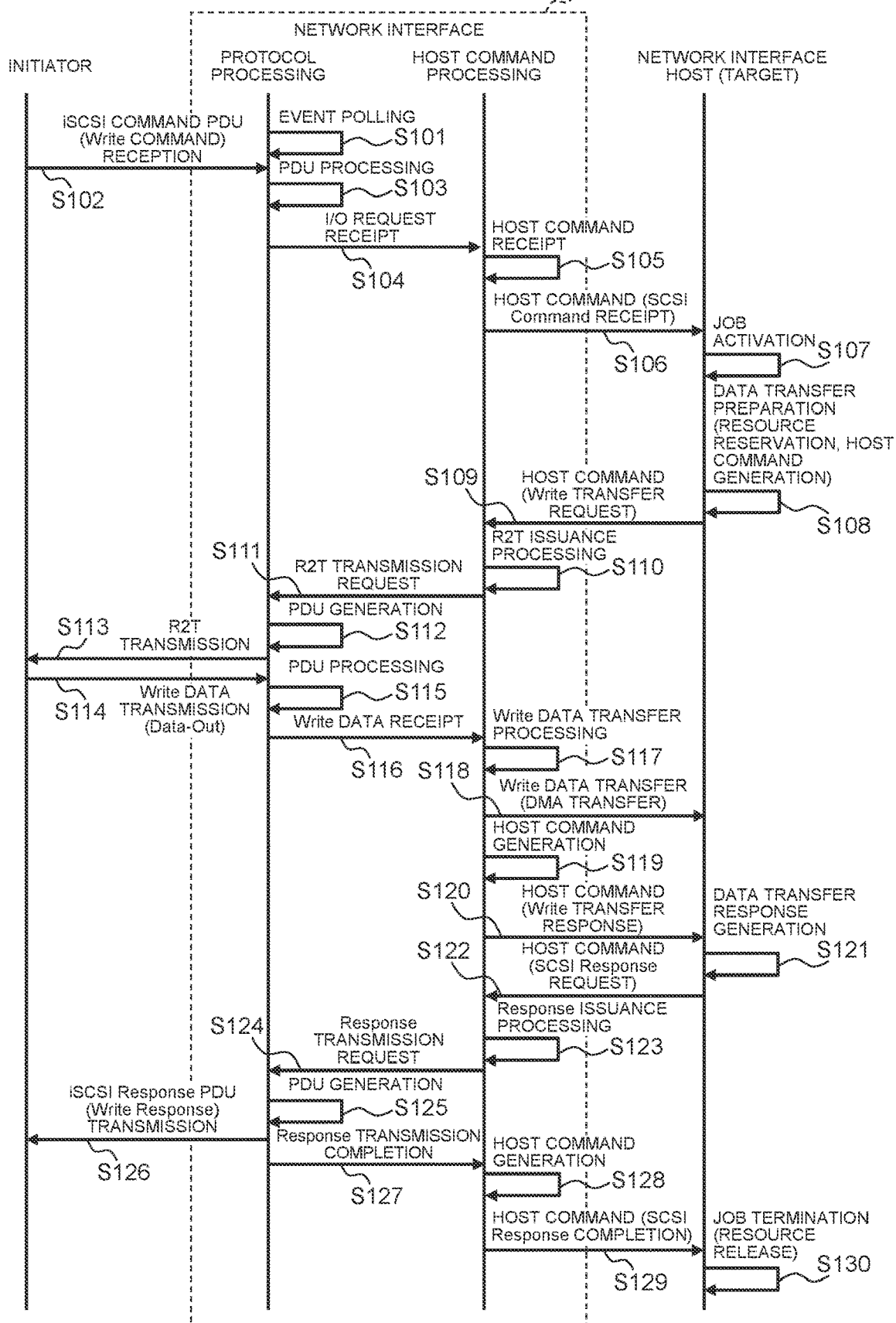
FIG. 10 shows a case where write data is transferred in a typical transfer scheme different from Immediate Data transfer.

The subsequent steps S210 to S223 are the same as steps S117 to S130 in FIG. 10.

Figure 12:
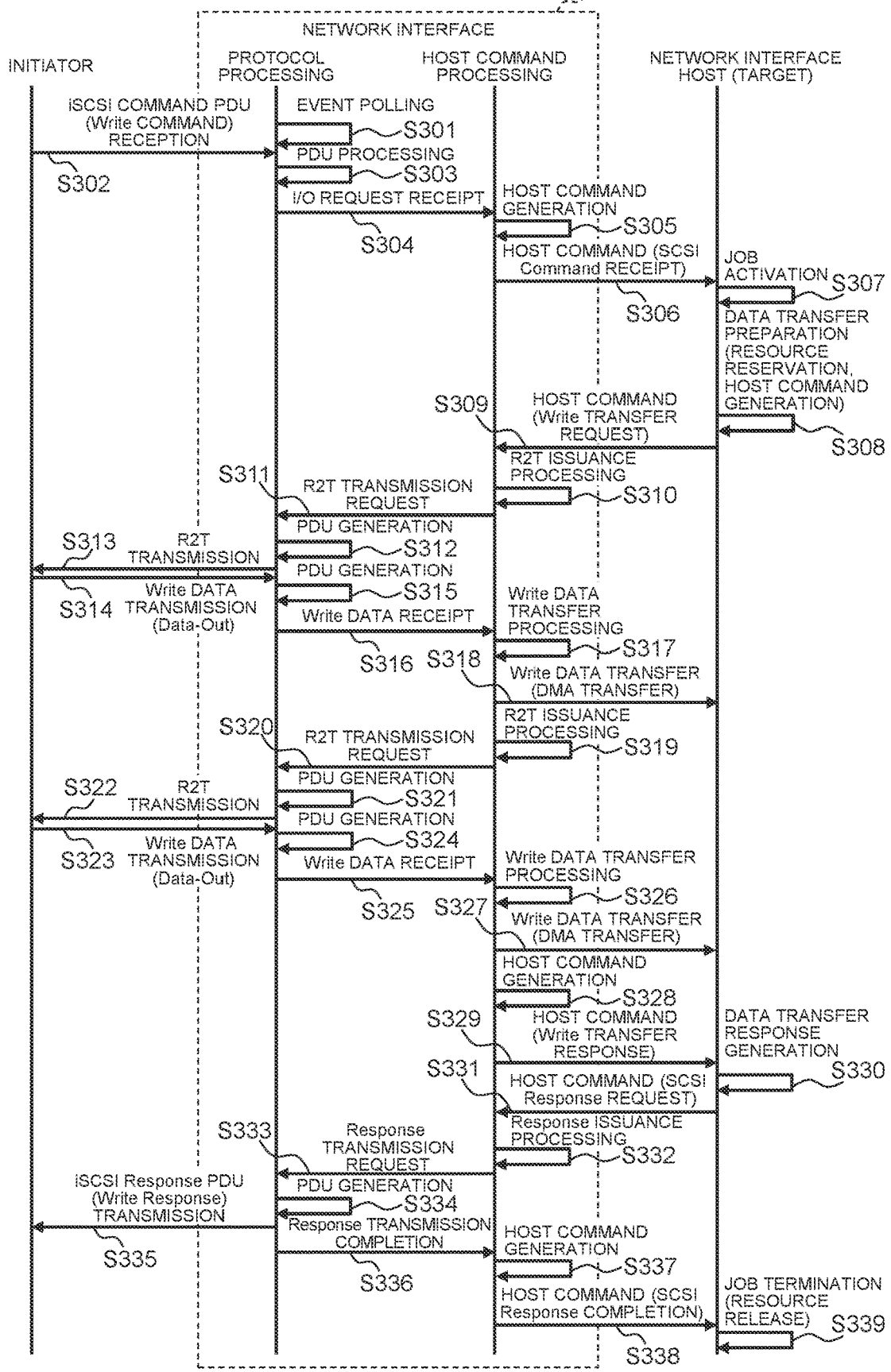
FIG. 12 shows the case where write data is transferred in the typical transfer scheme different from the Immediate Data transfer.

FIG. 12 shows a case where write data is transferred in the typical transfer scheme different from the Immediate Data transfer with InitialR2T being Yes. The Write command and the write data are not sent at once, and R2T is the transfer process necessary for transfer of first write data. FIG. 12 shows, however, a case where a large amount of data is transferred in two separate data transfer actions. In this case, it can also be said that the storage controller 102 supports InitialR2T enabled transfer.

Steps S301 to S318 in FIG. 12 are the same as steps S101 to S118 in FIG. 10 and will therefore not be described.

Steps S319 to S327 are the same as steps S310 to S318. In steps S310 to S318, the first write data transfer is performed, and in step S319 to step S327, the second write data transfer is performed in the same manner.

Furthermore, steps S328 to S339 in FIG. 12 are the same as steps S119 to S130 in FIG. 10 and will therefore not be described.

Figure 13:
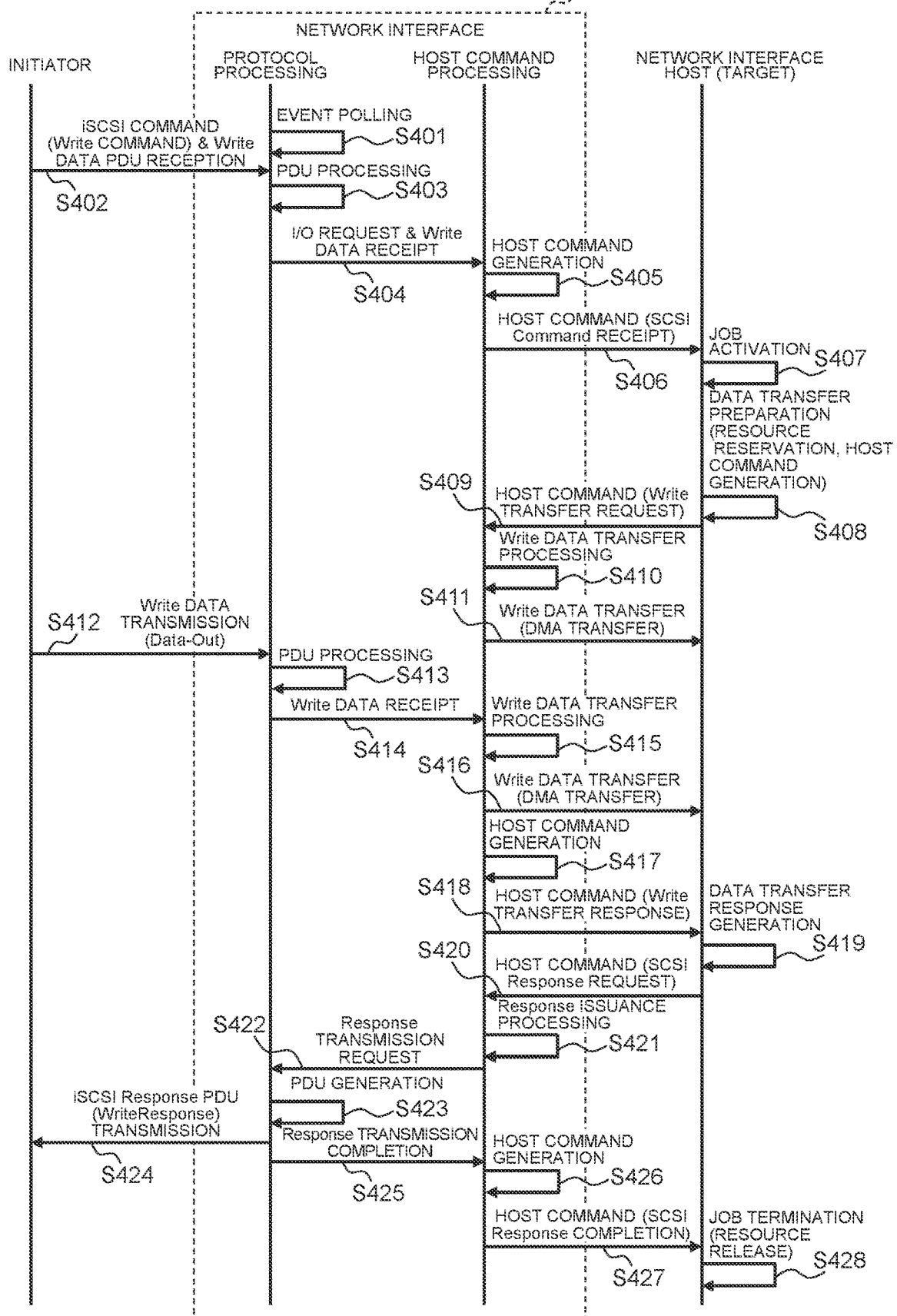
FIG. 13 shows the case where write data is transferred in the Immediate Data transfer scheme.

FIG. 13 shows a case where write data is transferred in the Immediate Data transfer scheme with InitialR2T being No. The Write command and the write data are sent at once, and R2T for transferring first write data is unnecessary transfer processing. In this case, it can also be said that the write request supports first R2T-free data transmission based on InitialR2T disabled transfer. FIG. 12 shows, however, the case where a large amount of data is transferred in two separate data transfer actions.

Steps S401 to S411 in FIG. 13 are the same as steps S201 to S211 in FIG. 11 and will therefore not be described.

Furthermore, steps S412 to S416 in FIG. 13 are the same as steps S114 to S118 in FIG. 10 and will therefore not be described.

Moreover, steps S417 to S428 in FIG. 13 are the same as steps S212 to S223 in FIG. 11 and will therefore not be described.

In steps S402 to S411, the first write data transfer is performed, and in step S412 to step S416, the second write data transfer is performed. The network interface 104 then uses the Immediate Data buffer 781 (see FIG. 8) to perform the first write data transfer. In contrast, the network interface 104 uses the InitialR2T buffer 782 (see FIG. 8) to perform the second write data transfer.

That is, the network interface 104 provides the Immediate Data buffer 781 as the buffer used to perform the Immediate Data transfer, as described with reference to FIG. 8. The network interface 104 then uses the Immediate Data buffer 781 to perform the first write data transfer.

On the other hand, although the InitialR2T buffer 782 is a buffer that is not used in the Immediate Data transfer but is used in the typical transfer scheme, the network interface 104 still provides the InitialR2T buffer 782 even in the Immediate Data transfer.

The network interface 104 uses the InitialR2T buffer 782 to perform the second write data transfer. That is, when the second write data is sent in the same session in the Immediate Data transfer, the InitialR2T buffer 782 is used to temporarily store the second write data.

When the InitialR2T buffer 782 is not used to transfer the second write data, Ready to Transfer (R2T) needs to be transmitted, and then the second write data needs to be transferred. To send the first write data, a write command is required, as in step S402, but when the InitialR2T buffer 782 is used, the second write data can be sent with no write command assigned, as in step S412.

As described above, providing and using the InitialR2T buffer 782 eliminates the need for the first Ready to Transfer (R2T), and no write command needs to be assigned when the second write data is sent. Therefore, even when a large amount of write data is transferred, and second Immediate Data transfer needs to be performed in the same session, the write data can be efficiently transferred.

For example, comparison between FIGS. 10 and 11 shows that the commands and write data transmitted and received to and from the network interface 104 and the target and vice versa are the same as both in the normal transfer scheme and the Immediate Data transfer. The same holds true for the comparison between FIGS. 12 and 13. On the other hand, even when the network interface 104 in the present embodiment is used in the normal transfer scheme, the amount of packet processing between the network interface 104 and the target is reduced as compared with a case where no network interface 104 is provided.

Figure 14A:
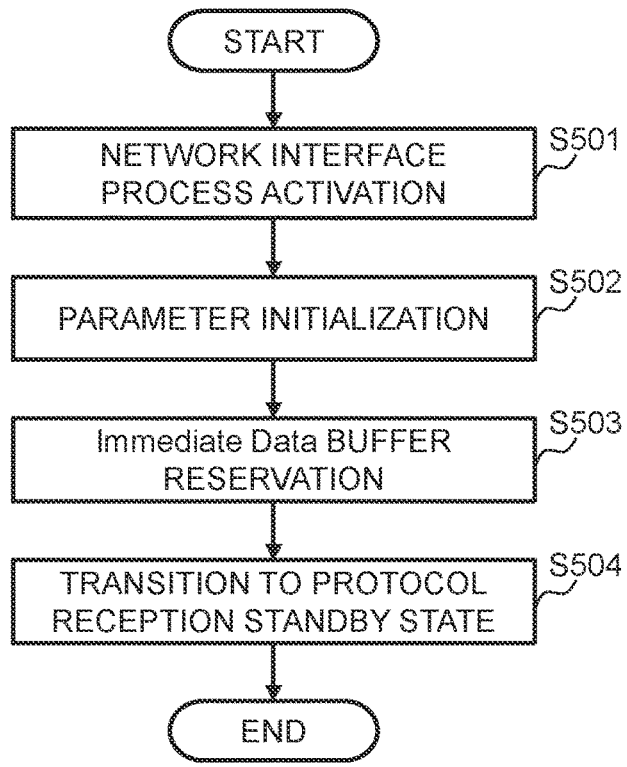
FIG. 14A is a flowchart for describing the procedure performed when the network interface provides an Immediate Data buffer.

FIG. 14A is a flowchart for describing the procedure performed when the network interface 104 provides the Immediate Data buffer 781.

The network interface 104 first activates a network interface process (step S501).

The network interface 104 then initializes parameters (step S502).

Furthermore, the network interface 104 reserves the Immediate Data buffer 781 (step S503).

The network interface 104 then transitions to a protocol reception standby state (step S504).

Figure 14B:
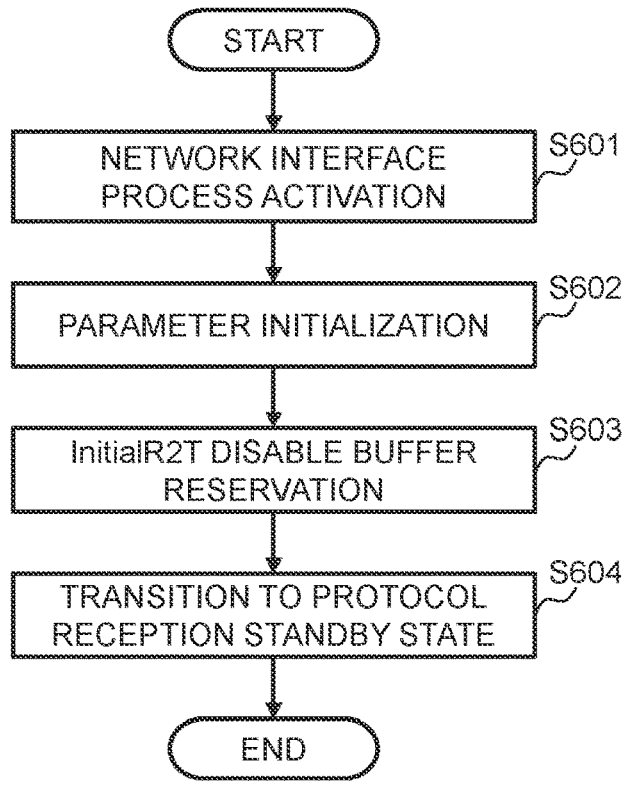
FIG. 14B is a flowchart for describing the procedure performed when the network interface provides an InitialR2T buffer.

FIG. 14B is a flowchart for describing the procedure performed when the network interface 104 provides the InitialR2T buffer 782.

The network interface 104 first activates the network interface process (step S601).

The network interface 104 then initializes parameters (step S602).

Furthermore, the network interface 104 reserves the InitialR2T buffer 782 (step S603).

The network interface 104 then transitions to the protocol reception standby state (step S604).

Figure 15:
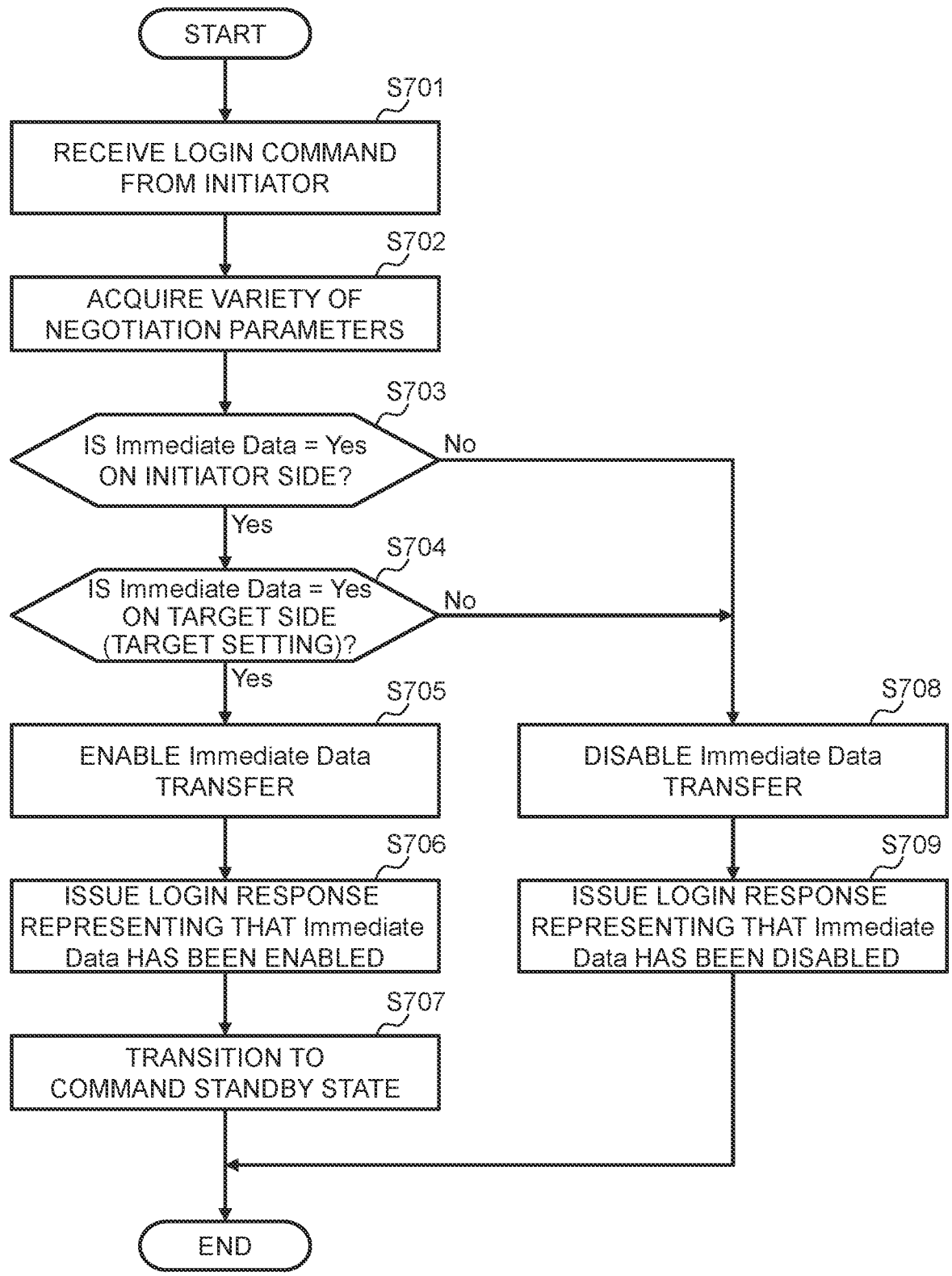
FIG. 15 is a flowchart for describing a first example of processes to be carried out until the network interface transitions to a command standby state.

FIG. 15 is a flowchart for describing a first example of processes to be carried out until the network interface 104 transitions to a command standby state.

The network interface 104 first receives a login command from the initiator (step S701).

The network interface 104 then acquires a variety of negotiation parameters (step S702).

Furthermore, the network interface 104 evaluates whether or not Immediate Data=Yes is satisfied on the initiator side (step S703).

As a result, when Immediate Data=Yes is satisfied (Yes in step S703), the network interface 104 evaluates whether or not Immediate Data=Yes is satisfied on the target side (target setting) (step S704).

When Immediate Data=Yes is satisfied (Yes in step S704), the network interface 104 enables Immediate Data transfer (step S705). That is, when both the initiator side and the target side (target setting) are set so as to perform the Immediate Data transfer, the network interface 104 enables Immediate Data transfer.

Furthermore, the network interface 104 issues a login response representing that the Immediate Data transfer has been enabled (step S706).

The network interface 104 then transitions to the command standby state (step S707).

In contrast, when Immediate Data=Yes is not satisfied (No in step S703) on the initiator side and Immediate Data=Yes is not satisfied (No in step S704) on the target side (target setting), the network interface 104 disables the Immediate Data transfer (step S708). That is, when one of the initiator side and the target side (target setting) is set so as not to perform the Immediate Data transfer, the network interface 104 disables the Immediate Data transfer.

Furthermore, the network interface 104 issues a login response representing that the Immediate Data transfer has been disabled (step S709).

Figure 16:
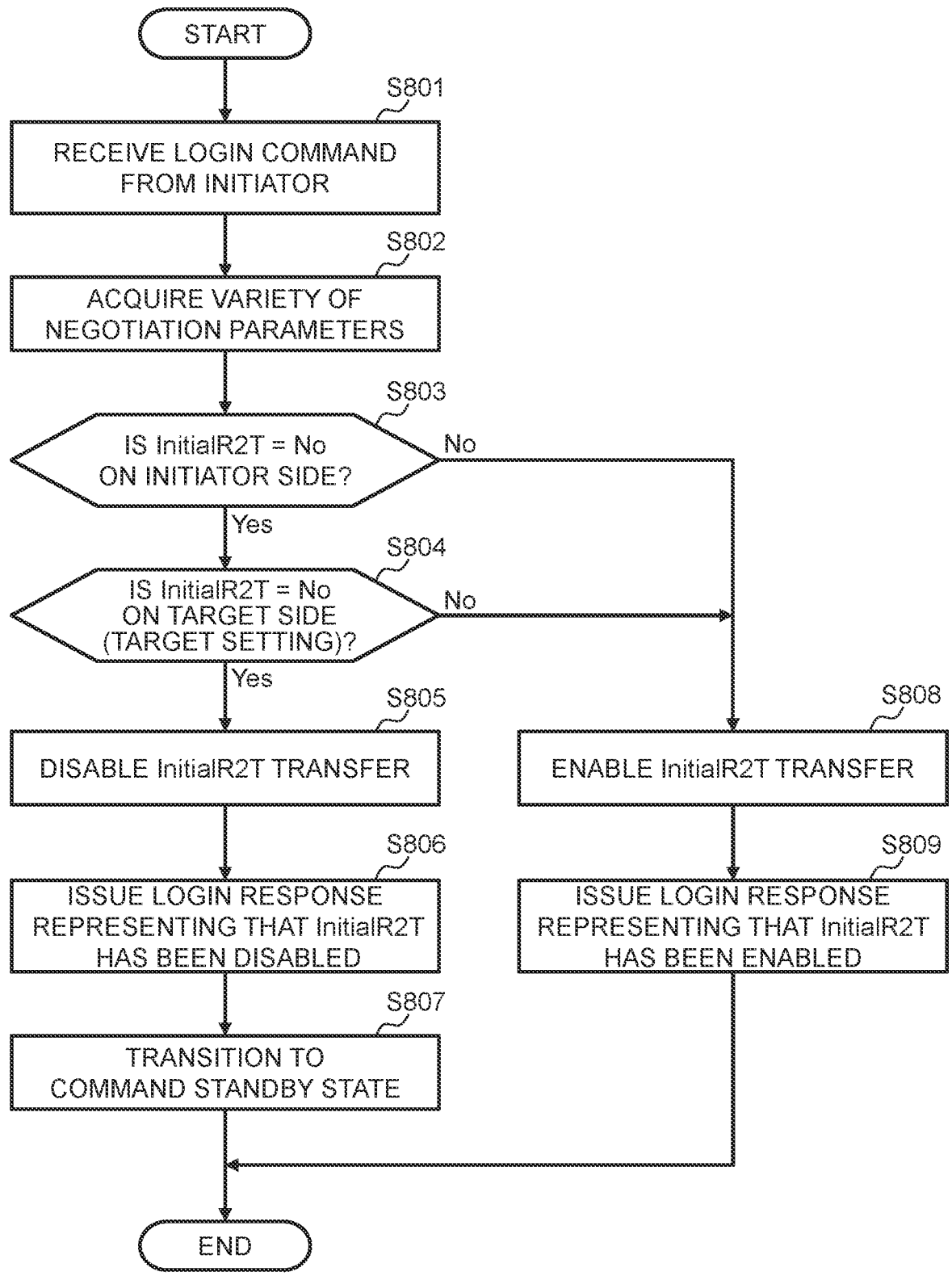
FIG. 16 is a flowchart for describing a second example of processes to be carried out until the network interface transitions to the command standby state.

FIG. 16 is a flowchart for describing a second example of processes to be carried out until the network interface 104 transitions to the command standby state.

The network interface 104 first receives a login command from the initiator (step S801).

The network interface 104 then acquires a variety of negotiation parameters (step S802).

Furthermore, the network interface 104 evaluates whether or not InitialR2T=No is satisfied on the initiator side (step S803).

As a result, when Immediate Data=No is satisfied (Yes in step S803), the network interface 104 evaluates whether or not InitialR2T=No is satisfied on the target side (target setting) (step S804).

When InitialR2T=No is satisfied (Yes in step S804), the network interface 104 disables the InitialR2T transfer (step S805). That is, when neither the initiator side nor the target side (target setting) is set so as to perform the InitialR2T transfer, the network interface 104 disables the InitialR2T transfer. When the InitialR2T transfer is disabled, the first Ready to Transfer (R2T) is unnecessary for the second write data transfer in FIG. 13. In this case, a write command does not need to be assigned to send the second write data, as shown in FIG. 13.

Furthermore, the network interface 104 issues a login response representing that the InitialR2T transfer has been disabled (step S806).

The network interface 104 then transitions to the command standby state (step S807).

In contrast, when InitialR2T=No is not satisfied (No in step S803) on the initiator side and InitialR2T=No is not satisfied (No in step S804) on the target side (target setting), the network interface 104 enables the InitialR2T transfer (step S808). That is, when the initiator side and the target side (target setting) both have settings except for no InitialR2T transfer, the network interface 104 enables InitialR2T transfer. When the InitialR2T transfer is enabled, Ready to Transfer (R2T) is necessary for the second write data transfer in FIG. 13. In this case, a write command needs to be assigned to send the second write data, which differs from the situation in FIG. 13.

Furthermore, the network interface 104 issues a login response representing that the InitialR2T transfer has been enabled (step S809).

Figure 17:
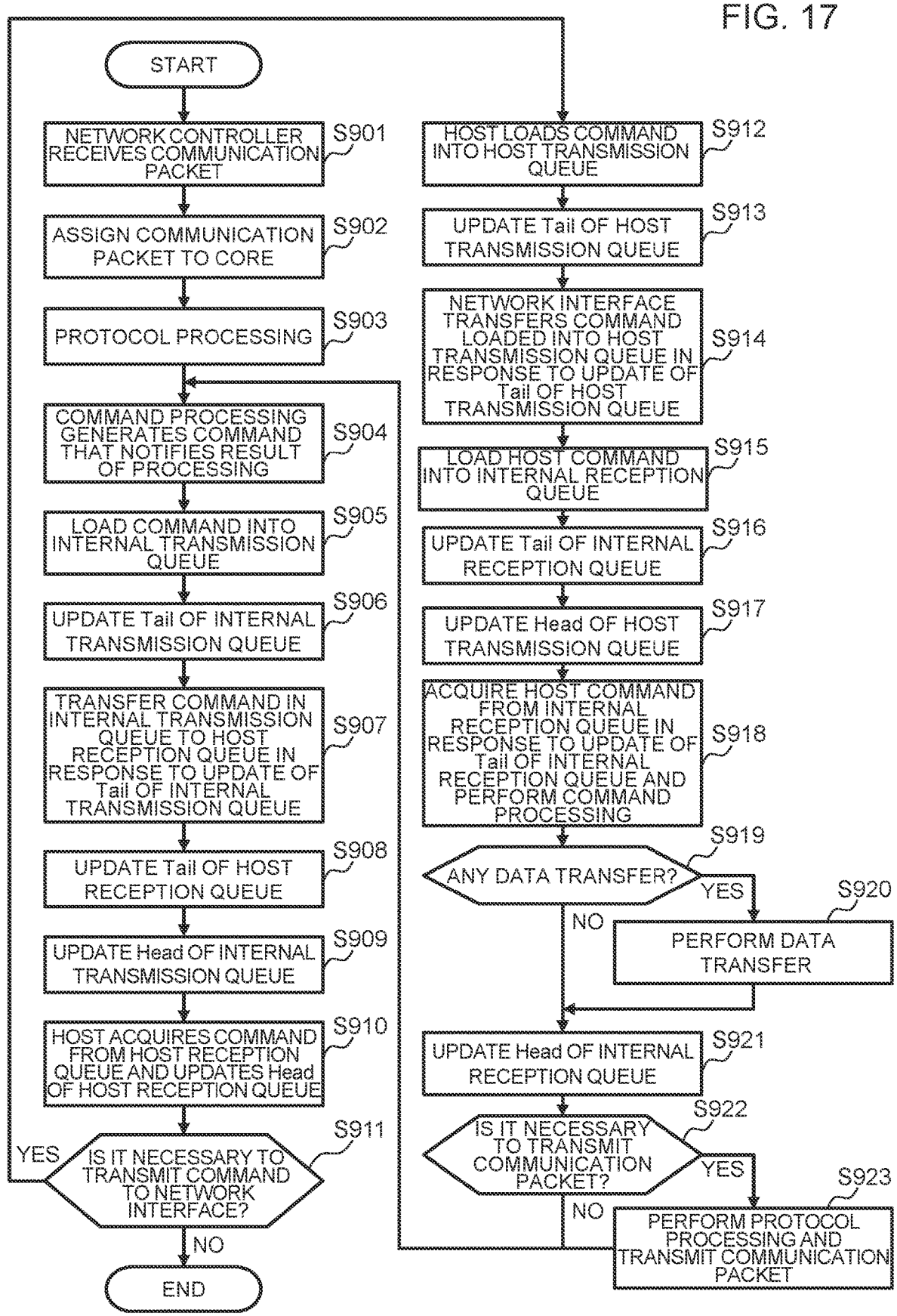
FIG. 17 shows an example of the process procedure executed when the network interface is provided on a target side.
Figure 18:
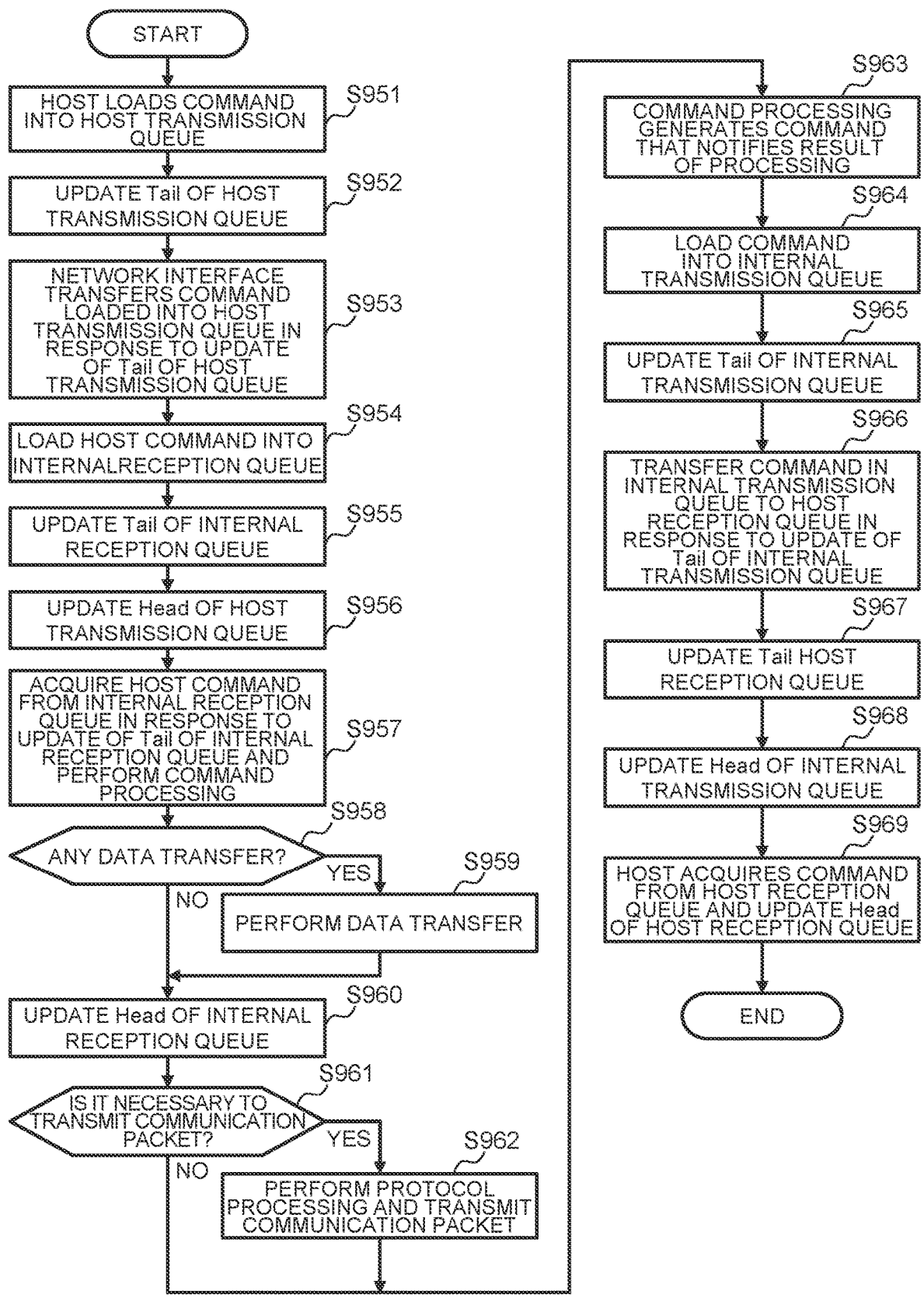
FIG. 18 shows an example of the process procedure executed when the network interface is provided on an initiator side.

FIGS. 17 and 18 are flowcharts for describing the processes shown in FIG. 5 in more detail.

FIG. 17 shows an example of the process procedure executed when the network interface 104 is provided on the target side.

The network interface 104 processes a communication packet from a network to the host of network interface 104. For example, the host is the storage controller 102 in the target, and a communication packet is transferred from the server system 100 in the initiator via the frontend network 106.

The network controller 203 receives the communication packet from the network (step S901). The network controller 203 assigns the protocol processing of the received communication packet to a core 241 of the processor 204 (step S902).

The core 241 to which the protocol processing of the communication packet has been allocated performs the protocol processing 303 (step S903). The protocol processing 303 extracts information from the communication packet and passes the extracted information to the command processing 305.

The command processing 305 generates a host command that notifies the host of the result of the communication protocol processing in accordance with the information extracted from the communication packet (step S904).

The notification of the result of the processing, for example, notifies the storage controller 102 that a read or write request has been received from the network. Furthermore, the command processing 305 loads the generated host command into the internal transmission queue 371 in the network interface 104 (step S905).

In response to the loading of the host command, the command processing 305 updates Tail of the internal transmission queue 371 (step S906).

In response to the update of Tail of the internal transmission queue 371 performed by the relevant core 241, the host queue control 304 uses the DMA controller 205 via the DMA control 307 to transfer the host command in the internal transmission queue 371 to the host reception queue 401 (step S907).

In response to the transfer of the host command, the host queue control 304 updates Tail of the host reception queue 401 (step S908). As for information on Tail or Head of the host reception queue 401, the network interface 104 and the host may refer to the same information, or may transfer information held thereby.

Furthermore, the host queue control 304 updates Head of the internal transmission queue 371 (step S909).

The host acquires the host command from the host reception queue 401 and updates Head of the host reception queue 401 (step S910). The network interface 104 may receive and update Head of the host reception queue 401 in accordance with the update on the host side, or may receive notification from the host at another timing. The host refers to the acquired host command and evaluates whether the command needs to be sent to the network interface 104 (step S911).

When the host needs to send the host command to the network interface 104 (YES in step S911), the host loads the host command into the host transmission queue 402 (step S912), and updates Tail of the host transmission queue 402 (step S913). In response to the update of the information on the host transmission queue 402 held by the host, the network interface 104 also updates the information on the host transmission queue 402 held by the network interface 104. As for the update, the host and the network interface 104 may refer to common information, or the updated information may be transferred between the host and the network interface 104.

On the other hand, when the host does not need to send the host command to the network interface 104 (NO in step S911), the series of processes is terminated.

In response to the update of Tail of the host transmission queue 402, the host queue control 304 of any of the cores 241 uses the DMA controller 205 via the DMA control 307 to transfer the host command loaded in the host transmission queue 402 to the network interface 104 (step S914). For example, the cores 241 may each periodically be locked to see if the host reception queue has been updated, and when the host reception queue has been updated, the host command may be transferred, or a core 241 dedicated to checking for update of the host reception queue and transfer of the host command may be provided, or a plurality of host reception queues are created, and the host command may be transferred when the reception queue for which the core 241 is responsible is updated. The host queue control 304 loads the host command from the host into the internal reception queue 372 (step S915). For example, the host queue control 304 may check the content of the host command to evaluate which internal reception queue 372 the host command is loaded into, or when there are a plurality of host reception queues, the host queue control 304 may load the host command into the corresponding internal reception queue 372.

In response to the loading of the host command into the internal reception queue 372, the host queue control 304 updates Tail of the internal reception queue 372 (step S916), and further updates Head of the host transmission queue 402 (step S917). The method for updating Head of the host transmission queue 402 has been described with reference to the update of Tail of the host transmission queue 402.

The command processing 305 acquires the host command from the internal reception queue 372 and executes the process instructed by the host command (step S918).

The command processing 305 then evaluates whether or not data transfer has been performed (step S919).

When data transfer using no buffer is required (YES in step S919), the DMA controller 205 transfers data between the network controller 203 and the host via no buffer (step S920).

When data transfer using no buffer is not required (NO in step S919), the next process is carried out with no data transfer. The host queue control 304 updates Head of the internal reception queue 372 (step S921).

The command processing 305 then evaluates whether a communication packet needs to be transmitted to the network (step S922).

When no communication packet needs to be transmitted (NO in step S922), the procedure returns to step S904.

When a communication packet needs to be transmitted (YES in step S922), the command processing 305 requests the protocol processing 303 to perform the protocol processing to generate a communication packet, and the network controller 203 transmits the communication packet to the network (step S923).

FIG. 18 shows an example of the process procedure executed when the network interface 104 is provided on the initiator side.

This is, for example, a case where the network interface 104 is incorporated in the server system 100, which accesses the storage controllers 102, or a case where the network interface 104 is incorporated in the storage controller 102 in the initiator in inter-storage communication.

The host loads the host command into the host transmission queue 402 (step S951) and updates Tail of the host transmission queue 402 (step S952). In response to the update of the information on the host transmission queue 402 held by the host, the network interface 104 also updates the information on the host transmission queue 402 held by the network interface 104. The host and the network interface 104 may refer to common information, or the updated information may be transferred between the host and the network interface 104.

In response to the update of Tail of the host transmission queue 402, the command processing 305 of any of the cores 241 uses the DMA controller 205 via the DMA control 307 to transfer the host command loaded in the host transmission queue 402 to the network interface 104 (step S953). For example, the cores 241 may each periodically be locked to see if the host reception queue has been updated, and when the host reception queue has been updated, the host command may be transferred, or a core 241 dedicated to checking for update of the host reception queue and transfer of the host command may be provided, or a plurality of host reception queues are created, and the host command may be transferred when the reception queue for which the core 241 is responsible is updated.

The host queue control 304 loads the host command from the host into the internal reception queue 372 (step S954). For example, in the case of a new session, the host queue control 304 may select in a round-robin fashion the internal reception queue 372 to which the hose command will be loaded, may determine which internal reception queue 372 the host command is loaded into by checking the content of the host command, or when there are a plurality of host reception queues, the host queue control 304 may load the host command into the corresponding internal reception queue 372.

In response to the loading of the host command into the internal reception queue 372, the host queue control 304 updates Tail of the internal reception queue 372 (step S955), and further updates Head of the host transmission queue 402 (step S956). The method for updating Head of the host transmission queue 402 has been described with reference to the update of Tail of the host transmission queue 402.

The command processing 305 acquires the host command from the internal reception queue 372 and executes the process instructed by the host command (step S957).

The command processing 305 then evaluates whether or not data transfer has been performed (step S958). When data transfer using no buffer is required (YES in step S958), the DMA controller 205 transfers data between the network controller 203 and the host via no buffer (step S959).

When data transfer using no buffer is not required (NO in step S958), the host queue control 304 updates Head of the internal reception queue 372 (step S960).

The command processing 305 then evaluates whether a communication packet needs to be transmitted to the network (step S961).

When no communication packet needs to be transmitted (NO in step S961), the procedure proceeds to step S963.

When a communication packet needs to be transmitted (YES in step S961), the command processing 305 requests the protocol processing 303 to perform the protocol processing to generate a communication packet, and the network controller 203 transmits the communication packet to the network (step S962).

The command processing 305 then generates a host command that notifies the host of the result of the process instructed by the host command from the host (step S963). The notification of the result of the process, for example, notifies the host that the communication packet has been transmitted to the network.

Furthermore, the command processing 305 loads the generated host command into the internal transmission queue 371 in the network interface 104 (step S964).

In response to the loading of the host command, the command processing 305 updates Tail of the internal transmission queue 371 (step S965).

The host queue control 304, in response to the update of Tail of the internal transmission queue 371 in the core 241 for which the host queue control 304 is responsible, uses the DMA controller 205 via the DMA control 307 to transfer the host command in the internal transmission queue 371 to the host reception queue 401 (step S966).

In response to the transfer of the host data, the host queue control 304 updates Tail of the host reception queue 401 (step S967).

As for information on Tail or Head of the host reception queue 401, the network interface 104 and the host may refer to the same information, or may transfer information held thereby. The host queue control 304 further updates Head of the internal transmission queue 371 (step S968).

The host acquires the host command from the host reception queue 401 and updates Head of the host reception queue 401 (step S969).

<Description of Data Transmission Method>

The process carried out by any of the storage systems S is a data transmission method in the storage system S including the drive box 105, which stores data, the storage controller 102, which includes a processor and a cache memory and processes data input to and output from the drive box 105, and the network interface 104, which includes a processor. The method can be taken as a data transmission method in which when the network interface 104 receives a write request, the network interface 104 performs protocol processing on the write request and transfers a write command to the storage controller 102, the storage controller 102 receives the write command from the network interface 104, reserves a data storage area in the cache memory, and transmits a data transfer request to the network interface 104, the network interface 104 receives the data transfer request from the storage controller 102 and stores data relating to the write request in the reserved storage area of the cache memory, the storage controller 102 performs predetermined processing on the data stored in the cache memory and relating to the write processing, transfers a write response to the network interface 104, and the network interface 104 receives the write response from the storage controller 102 and performs the protocol processing to respond to the source of the write request.

REFERENCE SIGNS LIST

1: Information processing system, 100: Server system, 102: Storage controller, 104: Network interface, 105: Drive box, 106: Frontend network, 107: Backend network, 109: External network, 204: Processor, 208: Memory, 303: Protocol processing, 304: Host queue control, 305: Command processing, S: Storage system

What is claimed is:

1. A storage system comprising:
a storage drive that stores data;
a storage controller, coupled to the storage drive, that includes a processor and a cache memory and processes data input to and output from the storage drive; and
a network interface apparatus handling network protocols between a host and the storage controller, coupled to the storage controller, that includes a processor and a memory independently from the processor and the cache memory of the storage controller,
wherein when the network interface apparatus receives at once, from the host, both the data to be stored in the storage drive and a write request associated with the data,
the processor of the network interface apparatus performs protocol processing on the write request, stores the data and the write request at a reserved area being reserved before receiving the data and the write request, in the memory of the network interface apparatus and transfers a write command to the storage controller,
the processor of the storage controller receives the write command from the network interface apparatus, reserves a data storage area in the cache memory, and transmits a data transfer request to the network interface apparatus,
the processor of the network interface apparatus receives the data transfer request from the storage controller and stores data relating to the write request, which is stored in the memory, in the reserved storage area of the cache memory,
the processor of the storage controller performs predetermined processing on the data stored in the cache memory and relating to the write command, and transfers a write response to the network interface apparatus, and the processor of the network interface apparatus receives the write response from the storage controller and performs the protocol processing to respond to the host.

2. The storage system according to claim 1, wherein the write request is transmitted along with write data based on Immediate Data transfer.

3. The storage system according to claim 2, wherein the storage controller does not support the Immediate Data transfer.

4. The storage system according to claim 2, wherein the storage controller supports InitialR2T enabled transfer.

5. The storage system according to claim 1, wherein the write request supports first R2T-free data transmission based on InitialR2T disabled transfer.

6. The storage system according to claim 1, wherein when the processor of the storage controller performs as the predetermined processing at least one of making the data stored in the cache memory involatile, duplicating the data, and storing the data in the storage drive, the processor of storage controller transfers the write response.

7. A data transmission method in a storage system including a storage drive that stores data, a storage controller, coupled to the storage drive, that includes a processor and a cache memory and processes data input to and output from the storage drive, and a network interface apparatus handling network protocols between a host and the storage controller, coupled to the storage controller, that includes a processor and a memory independently from the processor and the cache memory of the storage controller, wherein when the network interface apparatus receives at once, from the host, both the data to be stored in the storage drive along with a write request associated with the data, the processor of the network interface apparatus performs protocol processing on the write request, stores the data and the write request at a reserved area being reserved before receiving the data and the write request, in the memory of the network interface apparatus and transfers a write command to the storage controller, the processor of the storage controller receives the write command from the network interface apparatus, reserves a data storage area in the cache memory, and transmits a data transfer request to the network interface apparatus, the processor of the network interface apparatus receives the data transfer request from the storage controller and stores data relating to the write request, which is stored in the memory, in the reserved storage area of the cache memory, the processor of the storage controller performs predetermined processing on the data stored in the cache memory and relating to the write command, and transfers a write response to the network interface apparatus, and the processor of the network interface apparatus receives the write response from the storage controller and performs the protocol processing to respond to the host.

8. A network interface apparatus handling network protocols between a host and storage controller having a processor and a cache memory, the network interface apparatus being coupled to the storage controller and including a processor and a memory independently from the processor and the cache memory of the storage controller and connected to a network, wherein when receiving at once, from the host, both data to be stored in a storage drive and a write request associated with the data via the network, the processor of the network interface apparatus performs protocol processing on the write request, stores the data and the write request at a reserved area being reserved before receiving the data and the write request, in the memory of the network interface apparatus and transfers a write command to the storage controller that does not contain the data, when receiving a data transfer request from the storage controller, the processor of the network interface apparatus stores the data stored in the memory in a storage area specified by the data transfer request, and when receiving a write response from the storage controller, the processor of the network interface apparatus performs the protocol processing to respond to the host.

* * * * *